US012566986B2

(12) United States Patent
Moores et al.

(10) Patent No.: US 12,566,986 B2
(45) Date of Patent: Mar. 3, 2026

(54) QUBIT DETECTION USING SUPERCONDUCTOR DEVICES

(71) Applicant: PsiQuantum Corp., Palo Alto, CA (US)

(72) Inventors: Brad A. J. Moores, Boulder, CO (US); Faraz Najafi, Palo Alto, CA (US)

(73) Assignee: PSIQUANTUM CORP., Palo Alto, CA (US)

( * ) Notice: Subject to any disclaimer, the term of this patent is extended or adjusted under 35 U.S.C. 154(b) by 1170 days.

(21) Appl. No.: 17/488,203

(22) Filed: Sep. 28, 2021

(65) Prior Publication Data

US 2022/0129779 A1 Apr. 28, 2022

Related U.S. Application Data

(60) Provisional application No. 63/124,011, filed on Dec. 10, 2020, provisional application No. 63/105,086, filed on Oct. 23, 2020.

(51) Int. Cl.
*G06N 10/00* (2022.01)
*B82Y 10/00* (2011.01)

(52) U.S. Cl.
CPC .............. *G06N 10/00* (2019.01); *B82Y 10/00* (2013.01)

(58) Field of Classification Search
CPC ...................................................... G06N 10/00
See application file for complete search history.

(56) References Cited

U.S. PATENT DOCUMENTS

| | | |
|---|---|---|
| 2003/0207766 A1 | 11/2003 | Esteve et al. |
| 2003/0224944 A1 | 12/2003 | Il'ichev et al. |
| 2004/0077503 A1 | 4/2004 | Blais et al. |
| 2007/0158791 A1 | 7/2007 | Wakana et al. |
| 2018/0069288 A1 | 3/2018 | Minev et al. |
| 2019/0148848 A1* | 5/2019 | Najafi .................. H03K 19/195 |
| | | 327/527 |
| 2019/0164959 A1 | 5/2019 | Thomas et al. |
| 2020/0027502 A1 | 1/2020 | Berggren et al. |

OTHER PUBLICATIONS

PsiQuantum Corp., PCT/US2021/054461, International Search Report and Written Opinion, Dec. 28, 2021, 13 pgs.
PsiQuantum Corp., PCT/US2021/054461, International Preliminary Report on Patentability, Apr. 13, 2023, 11 pgs.

* cited by examiner

*Primary Examiner* — Paul A Wartalowicz
(74) *Attorney, Agent, or Firm* — Morgan, Lewis & Bockius LLP

(57) ABSTRACT

A circuit includes a resonant circuit and a detection circuit. The detection circuit includes a superconducting component coupled with the resonant circuit, and an impedance component coupled to the superconducting component. The superconducting component is configured to receive an input current. The superconducting component is configured to carry a first current that has a current density that is less than a threshold current density, while the first resonant circuit is in the first state, and carry a second current that has a current density that exceeds the threshold current density while the first resonant circuit is in the second state, thereby transitioning the superconducting component to a non-superconducting state while the resonant circuit is in the second state. A method of operating the detection circuit is also described herein.

17 Claims, 30 Drawing Sheets

Figure 12A:
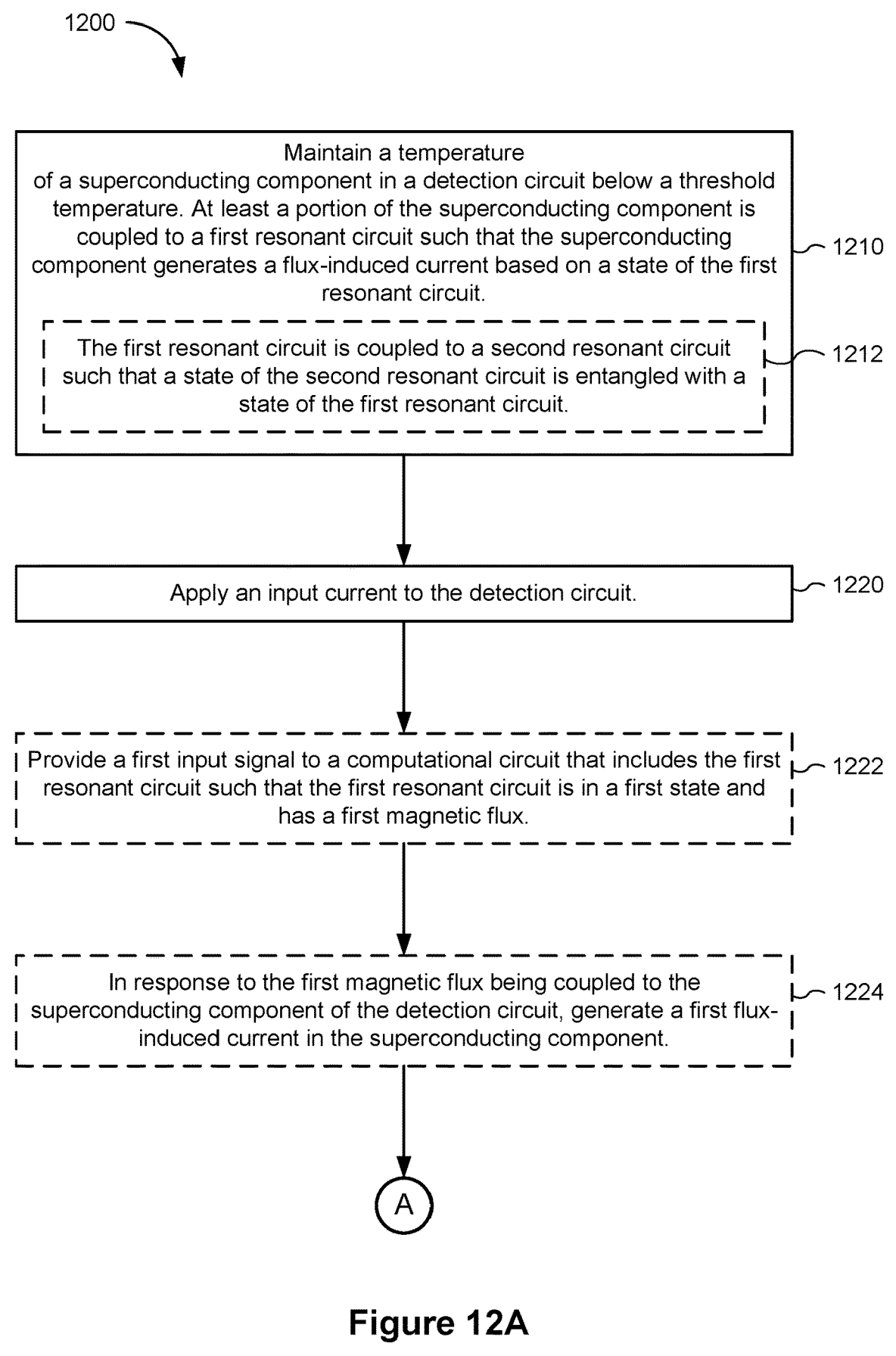

1200

Maintain a temperature
of a superconducting component in a detection circuit below a threshold
temperature. At least a portion of the superconducting component is
coupled to a first resonant circuit such that the superconducting
component generates a flux-induced current based on a state of the first
resonant circuit.
⟼ 1210

The first resonant circuit is coupled to a second resonant circuit
such that a state of the second resonant circuit is entangled with a
state of the first resonant circuit.
⟼ 1212

Apply an input current to the detection circuit.
⟼ 1220

Provide a first input signal to a computational circuit that includes the first
resonant circuit such that the first resonant circuit is in a first state and
has a first magnetic flux.
⟼ 1222

In response to the first magnetic flux being coupled to the
superconducting component of the detection circuit, generate a first flux-
induced current in the superconducting component.
⟼ 1224

Figure 12B:
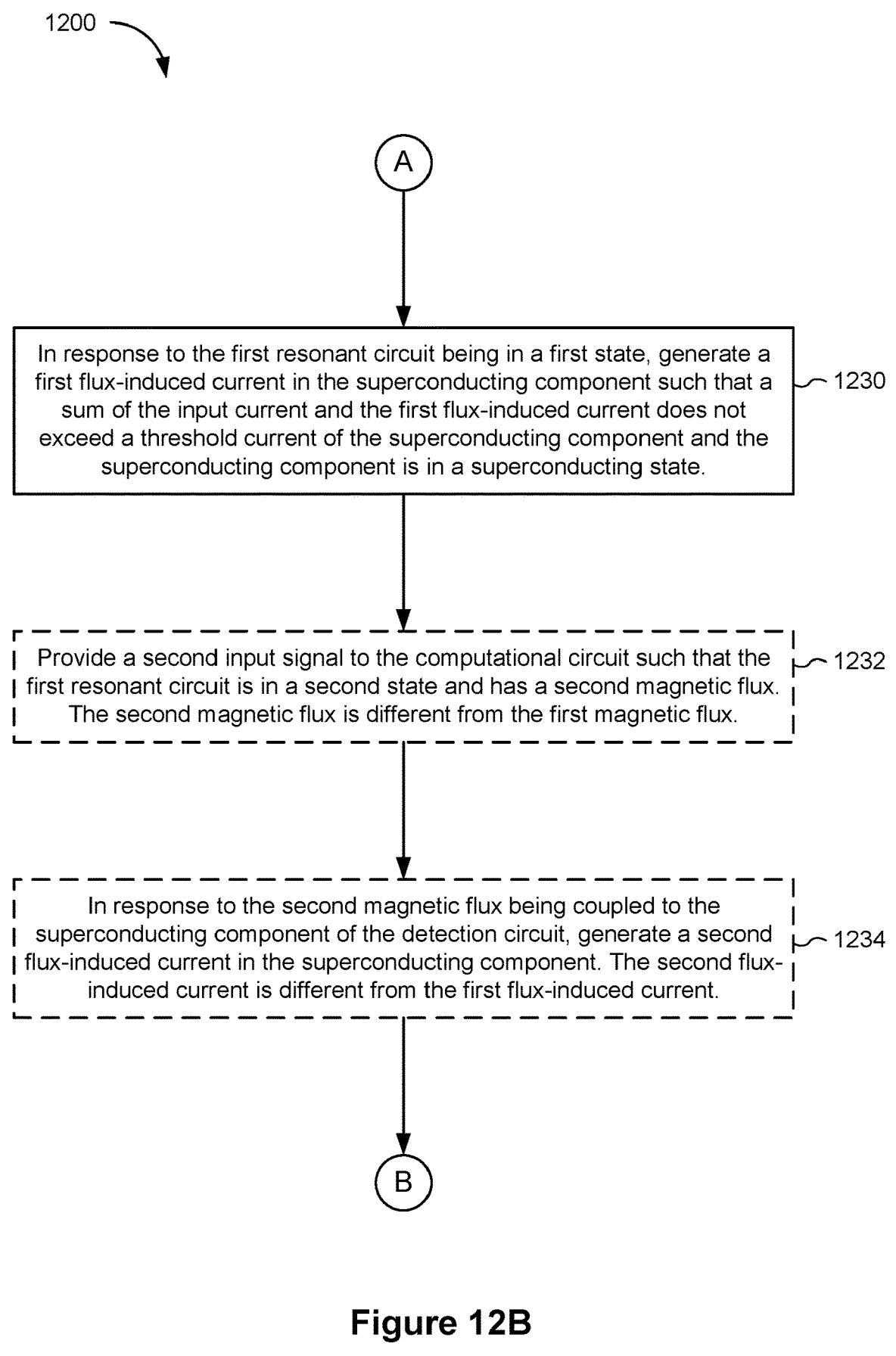

In response to the first resonant circuit being in a first state, generate a first flux-induced current in the superconducting component such that a sum of the input current and the first flux-induced current does not exceed a threshold current of the superconducting component and the superconducting component is in a superconducting state. — 1230

Provide a second input signal to the computational circuit such that the first resonant circuit is in a second state and has a second magnetic flux. The second magnetic flux is different from the first magnetic flux. — 1232

In response to the second magnetic flux being coupled to the superconducting component of the detection circuit, generate a second flux-induced current in the superconducting component. The second flux-induced current is different from the first flux-induced current. — 1234

1200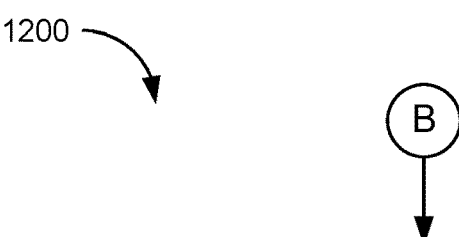

( B )

In response to the first resonant circuit being in a second state:

generate a second flux current in the superconducting component such that a sum of the input current and the second flux induced current exceeds the threshold current of the superconducting component;    ⌐ 1240 transition, by the superconducting component, from the superconducting state to a non-superconducting state; and redirect at least a portion of the input current from the superconducting component to an impedance component of the detection circuit.    ⌐ 1242

The superconducting component includes a wire forming a loop. The wire includes a first portion with a first width and a second portion with a second width that is larger than the first width.

In accordance with the first resonant circuit being in the second state, generate a second flux-induced current in the superconducting component such that a sum of the second flux-induced current and the input current exceeds the threshold current in the first portion of the wire thereby transitioning the first portion of the wire into the non-superconducting state.

In response to the first portion of the superconducting component being in the non-superconducting state, transition the second portion of the superconducting component into the non-superconducting state.

The impedance component has a lower resistance than a resistance of the superconducting component while the superconducting component is in the non-superconducting state.    ⌐ 1244

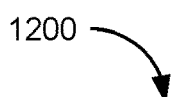

1200

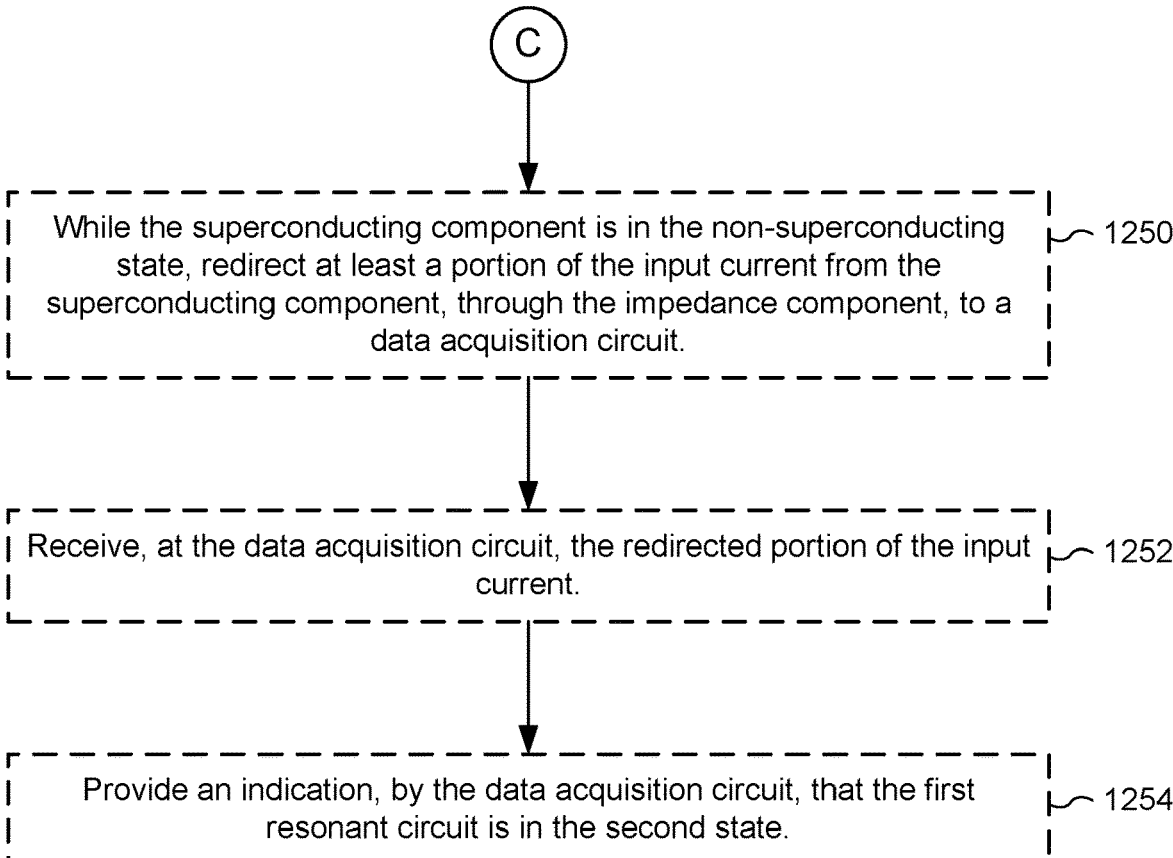

While the superconducting component is in the non-superconducting state, redirect at least a portion of the input current from the superconducting component, through the impedance component, to a data acquisition circuit.    1250

Receive, at the data acquisition circuit, the redirected portion of the input current.    1252

Provide an indication, by the data acquisition circuit, that the first resonant circuit is in the second state.    1254

Figure 13A:
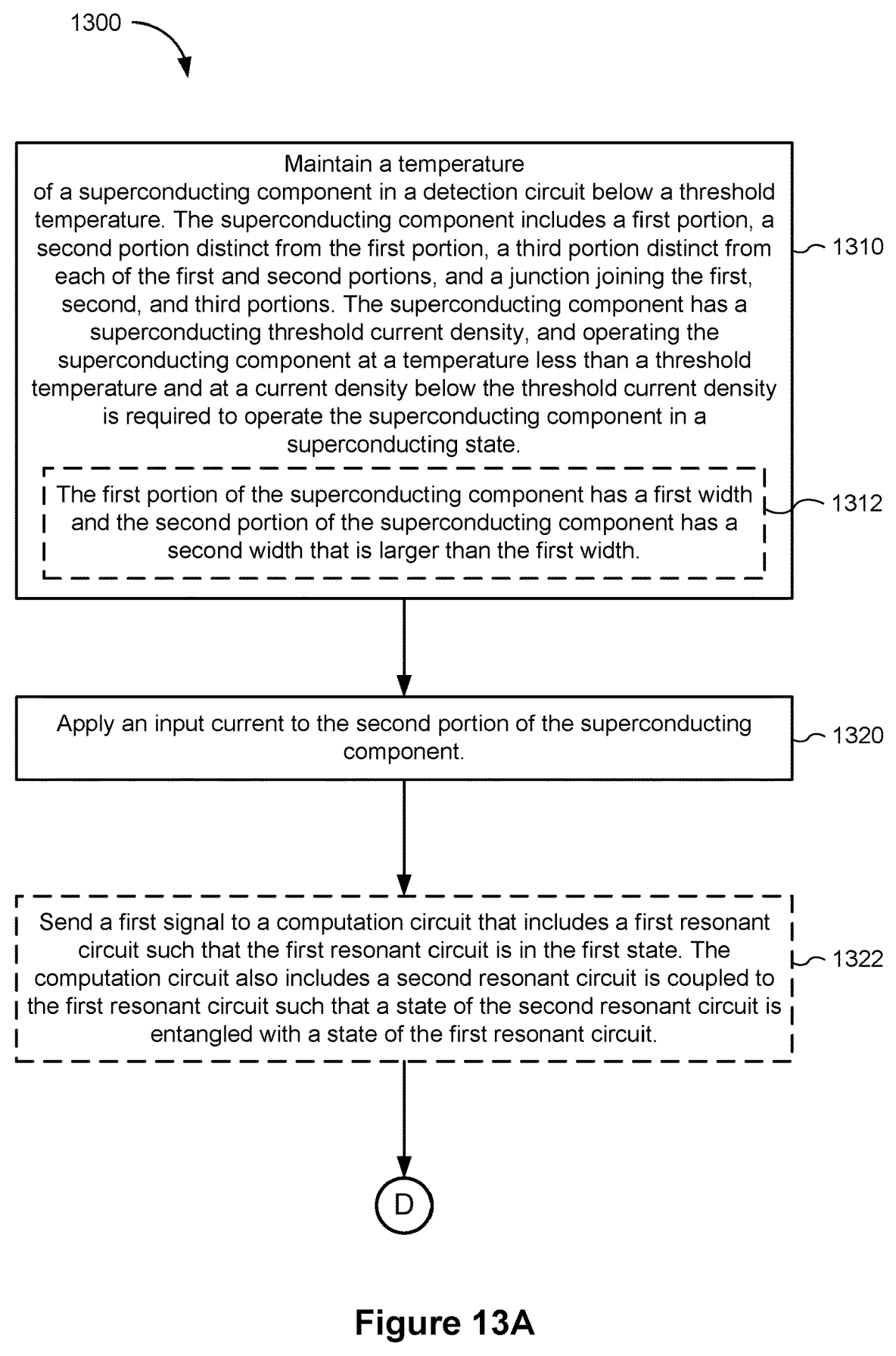

Maintain a temperature
of a superconducting component in a detection circuit below a threshold
temperature. The superconducting component includes a first portion, a
second portion distinct from the first portion, a third portion distinct from
each of the first and second portions, and a junction joining the first,
second, and third portions. The superconducting component has a
superconducting threshold current density, and operating the
superconducting component at a temperature less than a threshold
temperature and at a current density below the threshold current density
is required to operate the superconducting component in a
superconducting state.     1310

The first portion of the superconducting component has a first width
and the second portion of the superconducting component has a
second width that is larger than the first width.     1312

Apply an input current to the second portion of the superconducting
component.     1320

Send a first signal to a computation circuit that includes a first resonant
circuit such that the first resonant circuit is in the first state. The
computation circuit also includes a second resonant circuit is coupled to
the first resonant circuit such that a state of the second resonant circuit is
entangled with a state of the first resonant circuit.     1322

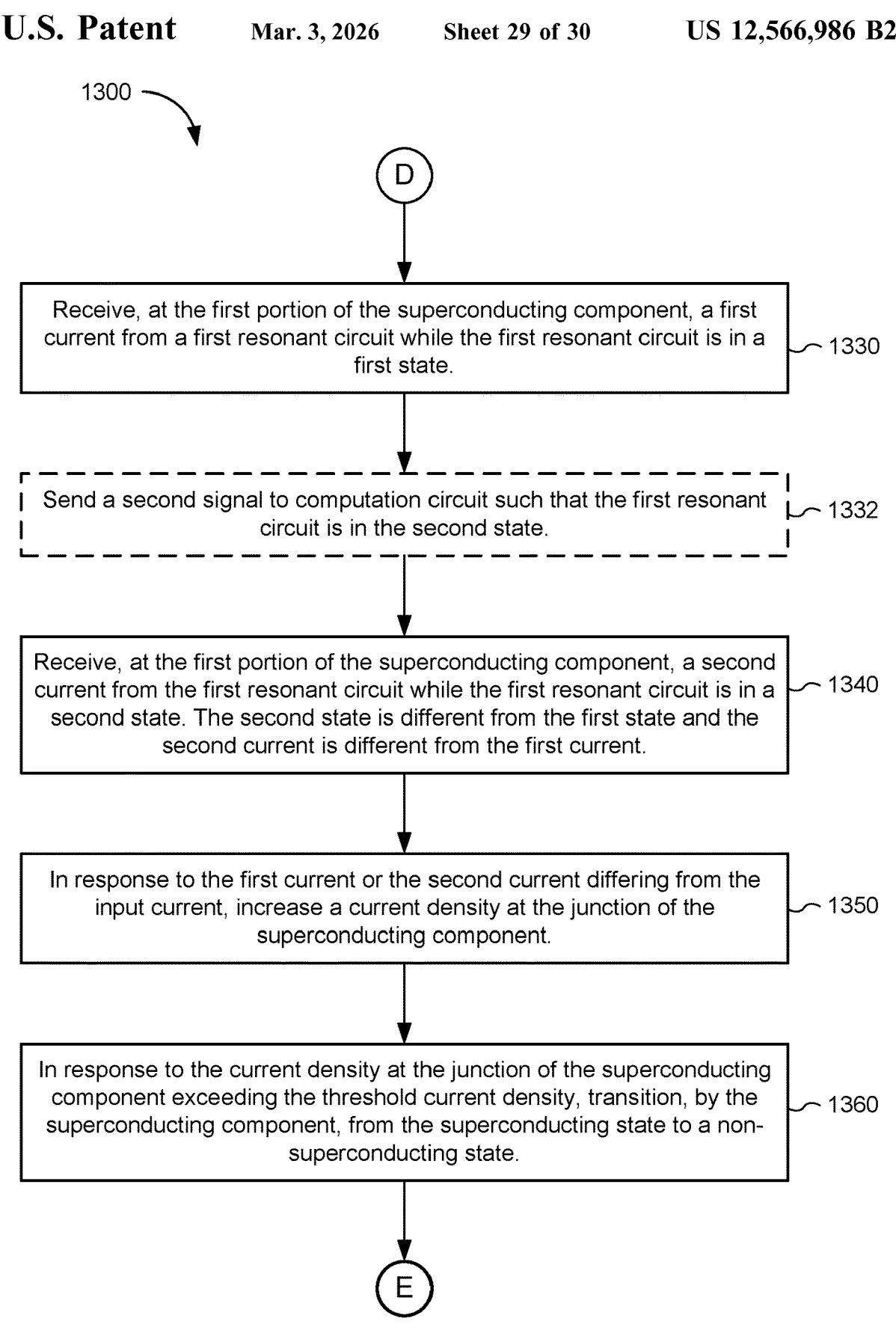

D

Receive, at the first portion of the superconducting component, a first current from a first resonant circuit while the first resonant circuit is in a first state.     1330

Send a second signal to computation circuit such that the first resonant circuit is in the second state.     1332

Receive, at the first portion of the superconducting component, a second current from the first resonant circuit while the first resonant circuit is in a second state. The second state is different from the first state and the second current is different from the first current.     1340

In response to the first current or the second current differing from the input current, increase a current density at the junction of the superconducting component.     1350

In response to the current density at the junction of the superconducting component exceeding the threshold current density, transition, by the superconducting component, from the superconducting state to a non-superconducting state.     1360

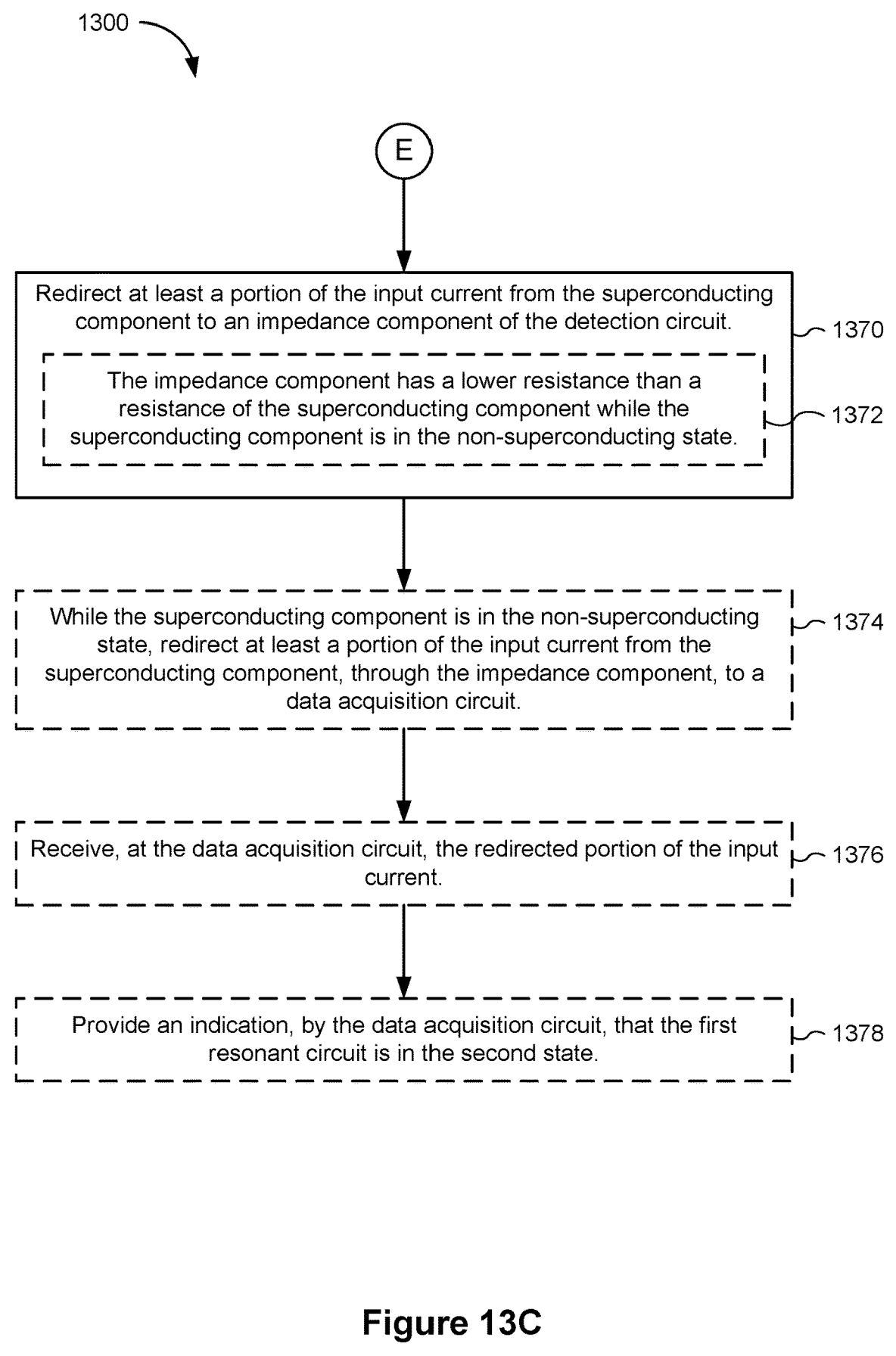

Redirect at least a portion of the input current from the superconducting component to an impedance component of the detection circuit. ⟋ 1370

The impedance component has a lower resistance than a resistance of the superconducting component while the superconducting component is in the non-superconducting state. ⟋ 1372

While the superconducting component is in the non-superconducting state, redirect at least a portion of the input current from the superconducting component, through the impedance component, to a data acquisition circuit. ⟋ 1374

Receive, at the data acquisition circuit, the redirected portion of the input current. ⟋ 1376

Provide an indication, by the data acquisition circuit, that the first resonant circuit is in the second state. ⟋ 1378

Figure 13C

QUBIT DETECTION USING SUPERCONDUCTOR DEVICES

PRIORITY AND RELATED APPLICATIONS

This applications claims priority to U.S. Provisional App. No. 63/124,011, filed Dec. 10, 2020, and U.S. Provisional App. No. 63/105,086, filed Oct. 23, 2020, each of which is incorporated by reference herein in its entirety.

TECHNICAL FIELD

This relates generally to superconducting devices, including but not limited to, devices utilizing both superconducting and non-superconducting states.

BACKGROUND

Superconductors are materials capable of operating in a superconducting state with zero electrical resistance under particular conditions. Superconductors are also capable of operating in a non-superconducting (conducting) state.

SUMMARY

Quantum information processing and quantum computing are exciting advances in technology that leverage quantum entanglement and superposition of quantum states to expand the computational capabilities of computer systems. An important aspect of quantum computing applications is the ability to generate and entangle quantum bits (also known as "qubits"), as well as determine a state of the qubit. Current detection methods have poor readout fidelity due high losses in the system between qubit circuitry components and qubit detection (e.g., qubit readout) components. Thus, there is a need for systems and/or devices with more efficient and reliable methods for providing an indication of a state of a qubit. Such systems, devices, and methods optionally complement or replace conventional systems, devices, and methods for determining a state of a qubit.

The present disclosure describes detection circuitry that utilizes superconducting components that can undergo a non-thermal phase transition from a superconducting state to a non-superconducting state. In some circumstances and embodiments, a superconducting component is integrated with or closely coupled to a qubit circuit, thereby reducing losses between the qubit circuit and the qubit state detection circuit, which improves qubit signal amplification and qubit readout reliability and fidelity.

In one aspect, some embodiments, an electrical circuit includes a resonant circuit (e.g., a qubit) and a detection circuit. The resonant circuit has (e.g., generates, produces) a first magnetic flux while the resonant circuit is in a first state and a second magnetic flux while the resonant circuit is in a second state that is different from the first state. The detection circuit includes a superconducting component that is located adjacent to and coupled with the resonant circuit, and an impedance component that is coupled to the superconducting component on one end and configured to be coupled to a second circuit on another end. The superconducting component is configured to receive an input current and to operate in a superconducting state while a temperature of the superconducting component is below a superconducting threshold temperature and a current carried in the superconducting component is below a threshold current of the superconducting component. The superconducting component is also configured to generate a flux-induced current based on a state of the resonant circuit such that the superconducting component carries (i) a first current, less than the threshold current, while the resonant circuit is in the first state and has the first magnetic flux, and (ii) a second current that exceeds the threshold current while the resonant circuit is in the second state and has the second magnetic flux, thereby transitioning the superconducting component to a non-superconducting state while the resonant circuit is in the second state.

In another aspect, some embodiments include a method of operating a detection circuit. The method includes maintaining a temperature of a superconducting component in the detection circuit below a threshold temperature. At least a portion of the superconducting component is coupled to a resonant circuit (e.g., a qubit) such that the superconducting component generates a flux-induced current based on a state of the resonant circuit. An input current (e.g., a bias current) is applied to the detection circuit. In response to the resonant circuit being in a first state, a first flux-induced current is generated in the superconducting component such that a sum of the input current and the first flux-induced current does not exceed a threshold current of the superconducting component and the superconducting component is in a superconducting state. In response to the resonant circuit being in a second state, a second flux-induced current is generated in the superconducting component such that a sum of the input current and the second flux-induced current exceeds the threshold current of the in the superconducting component. The superconducting component transitions from the superconducting state to a non-superconducting state and redirects at least a portion of the input current from the superconducting component to an impedance component of the detection circuit.

In yet another aspect, some embodiments include an electrical circuit that includes a resonant circuit (e.g., a qubit) and a detection circuit. The resonant circuit is configured to generate a first current in a first state and a second current in a second state. The second current is different from the first current and the second state is different from the first state. The detection circuit includes a superconducting circuit and an impedance component that is coupled to the superconducting component on one end and configured, on another end, to be coupled to a second circuit. The superconducting component has a first portion, a second portion distinct from the first portion, a third portion distinct from each of the first and second portions, and a junction joining the first, second, and third portions. The superconducting component has a superconducting threshold temperature and a threshold current density such that operating the superconducting component at a temperature less than threshold temperature and at a current density below the threshold current density is required to operate the superconducting component in a superconducting state. The resonant circuit includes the first portion and third portion of the superconducting component. The first portion of the superconducting component is coupled to receive at least a portion of the first current while the resonant circuit is in the first state and at least a portion of the second current while the resonant circuit is in the second state. The second portion of the superconducting component is configured to receive an input current. The junction is configured to experience current crowding such that a current density at the junction is greater than the threshold current density, and transition to a non-superconducting state in response to a difference between the input current in the second portion and a current in the first portion.

In another aspect, some embodiments include a method of operating a detection circuit. The method includes maintaining a temperature of a superconducting component in the detection circuit below a threshold temperature. The superconducting component includes a first portion, a second portion distinct from the first portion, a third portion distinct from each of the first and second portions, and a junction joining the first, second, and third portions. The superconducting component has a superconducting threshold current density, and operating the superconducting component at a temperature less than threshold temperature and at a current density below the threshold current density is required to operate the superconducting component in a superconducting state. An input current is applied to the second portion of the superconducting component. The resonant circuit includes the first portion and third portion of the superconducting component. The first portion of the superconducting component receives a first current from the resonant circuit while the resonant circuit is in a first state and receives a second current from the resonant circuit while the resonant circuit is in a second state. The second state is different from the first state and the second current is different from the first current. In response to the input current, and the first current or the second current, a current is produced in the superconducting component having a current density at the junction of the superconducting component. In response to the current density at the junction exceeding the threshold current density (e.g., while the resonant circuit is in a second state, or transitions to the second state from the first state), the superconducting component transitions from the superconducting state to a non-superconducting state, and at least a portion of the input current is redirected from the superconducting component to an impedance component of the detection circuit.

Thus, devices and circuits are provided with methods for operating superconducting devices, thereby increasing the effectiveness, efficiency, accuracy, precision, and user satisfaction with such circuits and devices.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 12A-12D are flow diagrams illustrating a method of operating the detection circuit shown in FIGS. 1A-1F and 2-6 in accordance with some embodiments.

FIGS. 13A-13C are flow diagrams illustrating a method of operating the detection circuit shown in FIGS. 7, 8A-8C, 9A-9E and 10-11, in accordance with some embodiments.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Many modifications and variations of this disclosure can be made without departing from its spirit and scope, as will be apparent to those skilled in the art. The specific embodiments described herein are offered by way of example only, and the disclosure is to be limited only by the terms of the appended claims, along with the full scope of equivalents to which such claims are entitled.

The present disclosure describes operating superconducting devices to utilize a non-thermal phase transition from a superconducting state to a high-resistance normal state (e.g., rather than a thermal transition to a non-superconducting conductive state). In some embodiments, the superconductor is adapted to transition between the superconducting state and the normal state while the superconducting device carries a current that exceeds a threshold current or a threshold current density of the superconducting device.

Figure 1A:
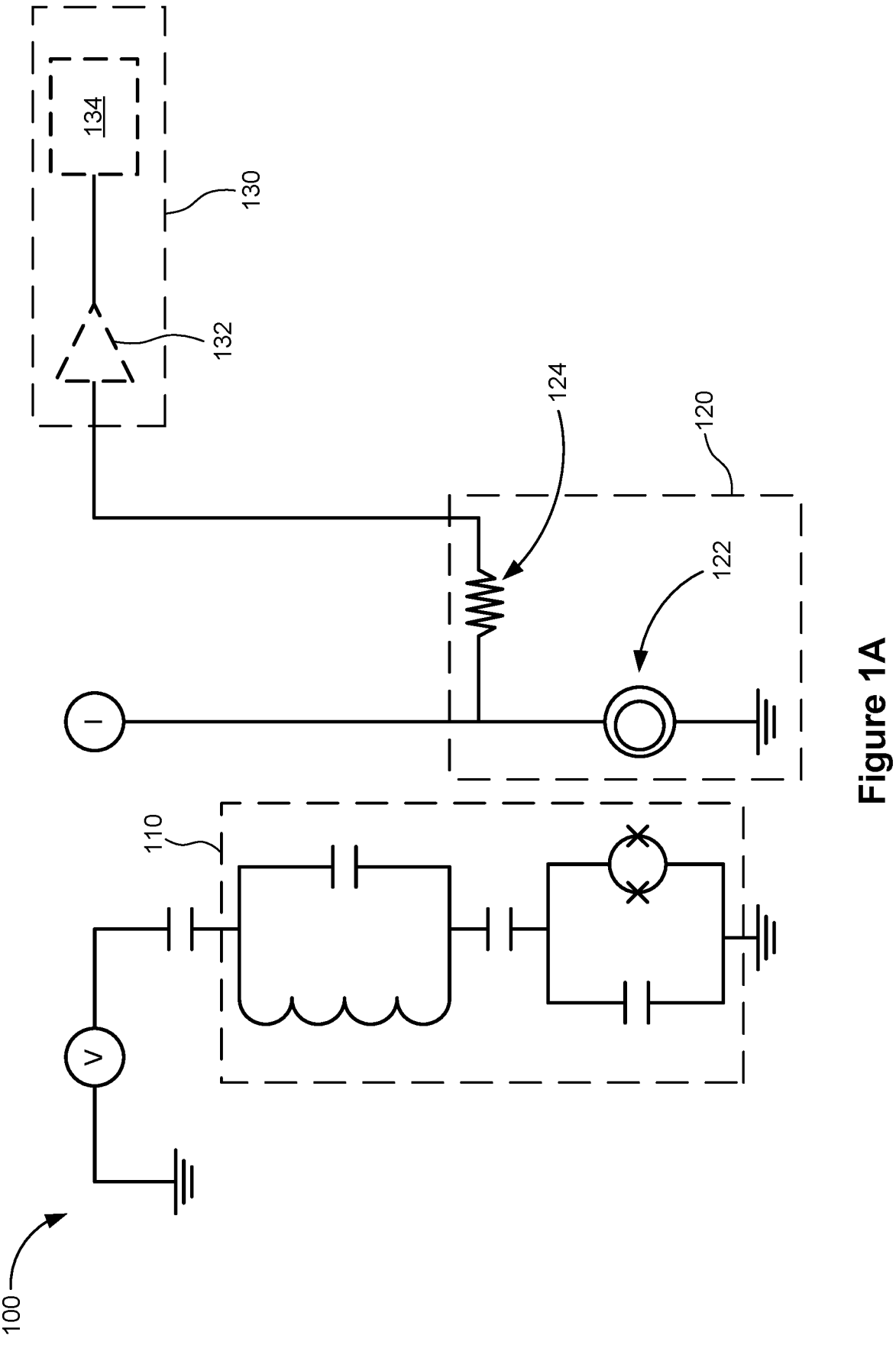
FIG. 1A is a circuit diagram illustrating a resonant circuit and a detection circuit in accordance with some embodiments.

FIG. 1A is a circuit diagram illustrating a circuit 100 that includes a resonant circuit 110 (e.g., a qubit circuit) and a detection circuit 120 in accordance with some embodiments. In some embodiments, the resonant circuit 110 is a superconducting qubit (e.g., transmon superconducting qubit) that can have a plurality of states (e.g., energy states). In such cases, the state of the resonant circuit 110 corresponds to the state of the superconducting qubit. The detection circuit 120 includes a superconducting component 122 and an impedance component 124. The superconducting component 122 is located (e.g., disposed) adjacent to and coupled (e.g., inductively coupled) with the resonant circuit 110. The superconducting component 122 has a threshold temperature and a threshold current above which the superconducting component 122 transitions from a superconducting state to a non-superconducting state. The superconducting component 122 has a lower impedance (e.g., zero, or approximately zero impedance) than the impedance component 124 while the superconducting component 122 is in the superconducting state (e.g., zero impedance in the superconducting state), and a higher impedance than the impedance component 124 while the superconducting component 122 is in the non-superconducting state. Using the superconducting transition properties (e.g., non-thermal superconducting transition properties) of superconducting component 122 and the relative impedances of the impedance component 124 and the superconducting component 122 in the superconducting and non-superconducting states, the detection circuit 120 is able to redirect the transmission path of electrical current transmitted through the detection circuit 120 such that the circuit 100 can provide a readout (e.g., signal, indication) of the state of the resonant circuit 110.

In some embodiments, the impedance component 124 is coupled to a circuit 130 (e.g., a readout circuit) that may include one or more signal amplifiers 132 and/or a data acquisition component 134. In some embodiments, as shown, the impedance component 124 is coupled in parallel to the superconducting component 122 such that electrical current transmitted through the detection circuit 120 is transmitted via a path with the least impedance. For example, while the superconducting component 122 is in the superconducting state, electrical current (e.g., a bias current, an input current) is transmitted through the detection circuit 120 via the superconducting component 122, and no current is transmitted through the impedance component 123; alternatively, the amount of current transmitted through the impedance component 124 is much less than the amount of current transmitted through the superconducting component 122 (e.g., the amount of current transmitted through the impedance component 124 is 1% or less, or 5% or less, of the amount of current transmitted through the superconducting component 122). In contrast, while the superconducting component 122 is in the non-superconducting state, electrical current is primarily transmitted through the detection circuit 120 via the impedance component 124 (e.g., in some implementations, the amount of current transmitted through the impedance component 124 is at least ten (10) times more, at least twenty (20) times more, or at least one hundred (100) times more than the amount of current transmitted through the superconducting component 122; e.g., in some implementations, superconducting component 122 has a resistance greater than 100 kOhm in the normal state, while impedance component 124 has a resistance of 1-10 kOhm).

In some embodiments, the impedance component 124 includes a resistive component (e.g., a resistor, an electrical component that has a non-zero resistance) that has a higher resistance than the superconducting component 122 while in the superconducting component 122 is in the superconducting state and a lower resistance than the superconducting component 122 while in the superconducting component 122 is in the non-superconducting state. In such cases, and when the impedance component 124 is coupled in parallel to the superconducting component 122, electrical current is transmitted through the detection circuit 120 primarily via the superconducting component 122 (e.g., at least 95% or 99% of the current is transmitted via the superconducting component 122) when the superconducting component 122 is in the superconducting state, and the electrical current is primarily transmitted via the impedance component 124 (e.g., at least 90% or 95% of the current is transmitted via the impedance component 124) while the superconducting component 122 is in the non-superconducting state.

Figure 1B:
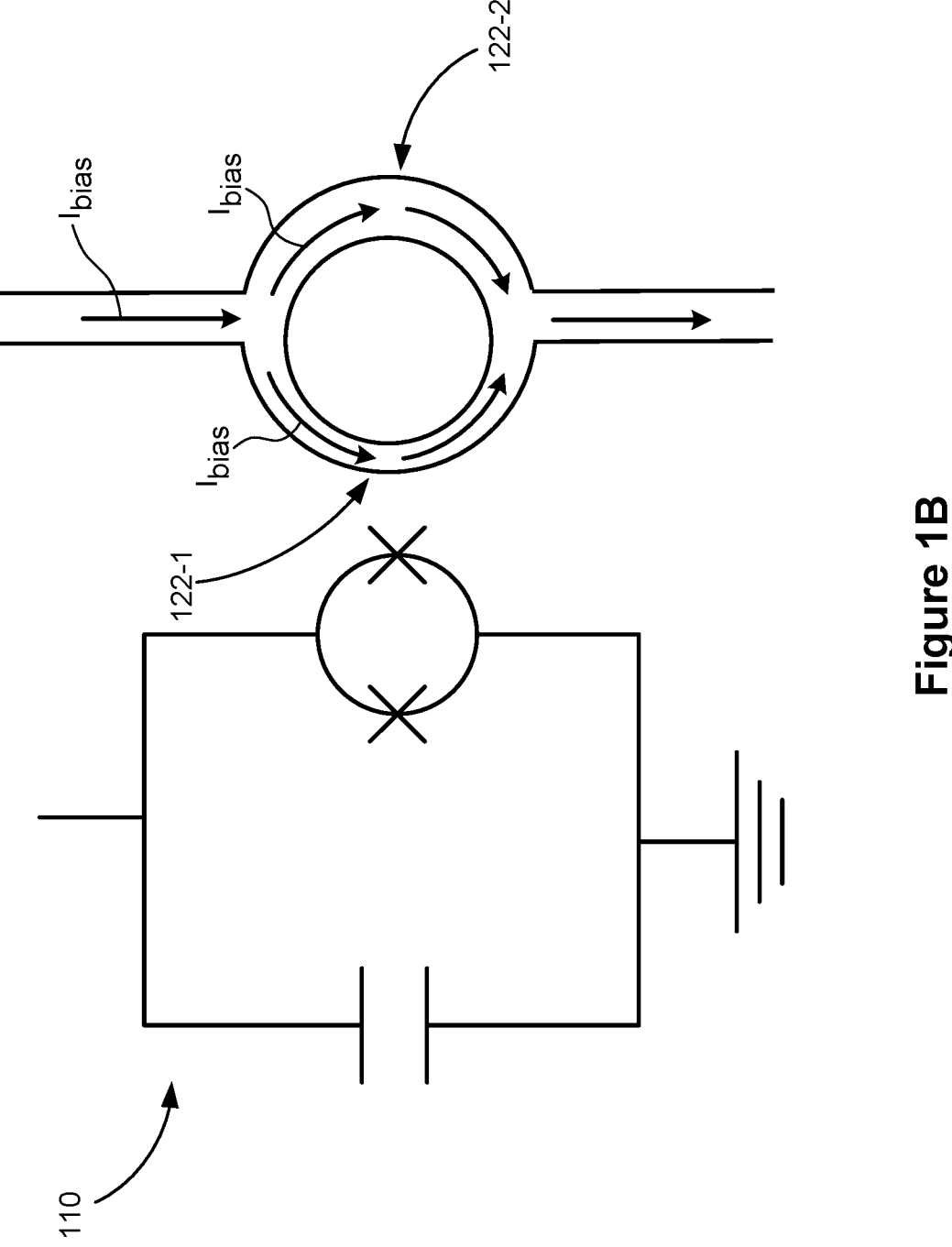
FIGS. 1B-1F are circuit diagrams illustrating operation of the detection circuit shown in FIG. 1A in accordance with some embodiments.
Figure 1C:
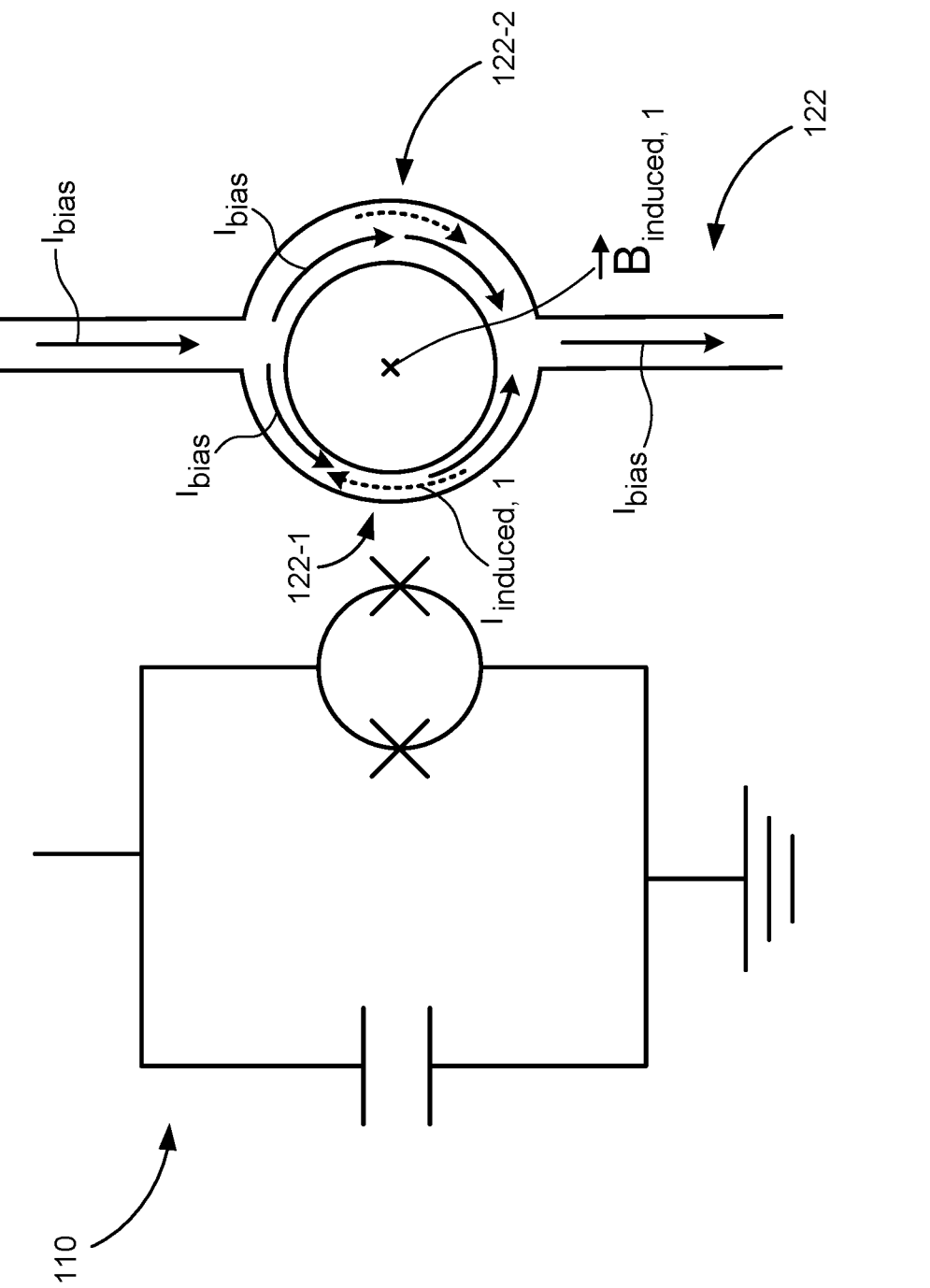
Figure 1D:
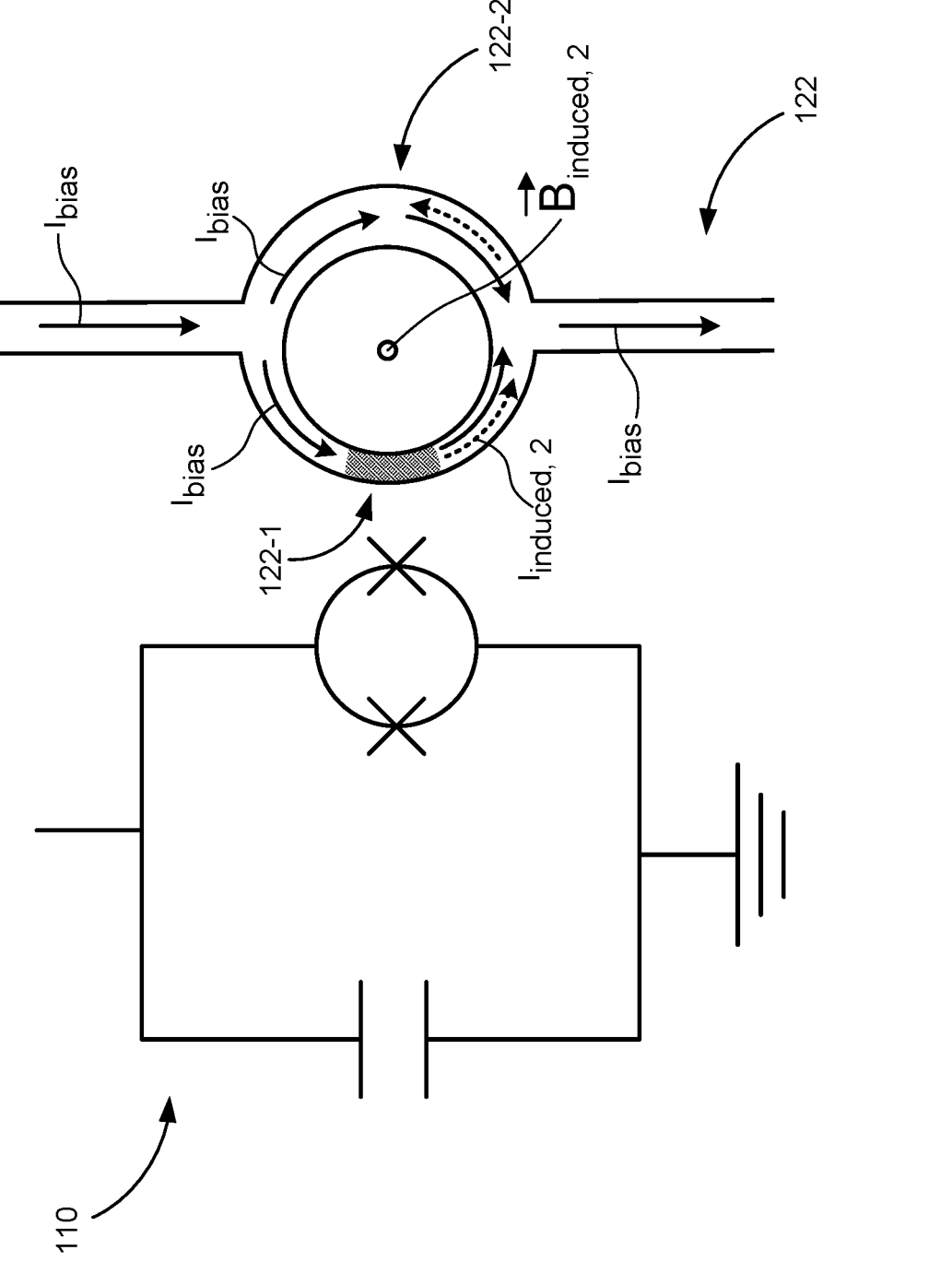
Figure 1E:
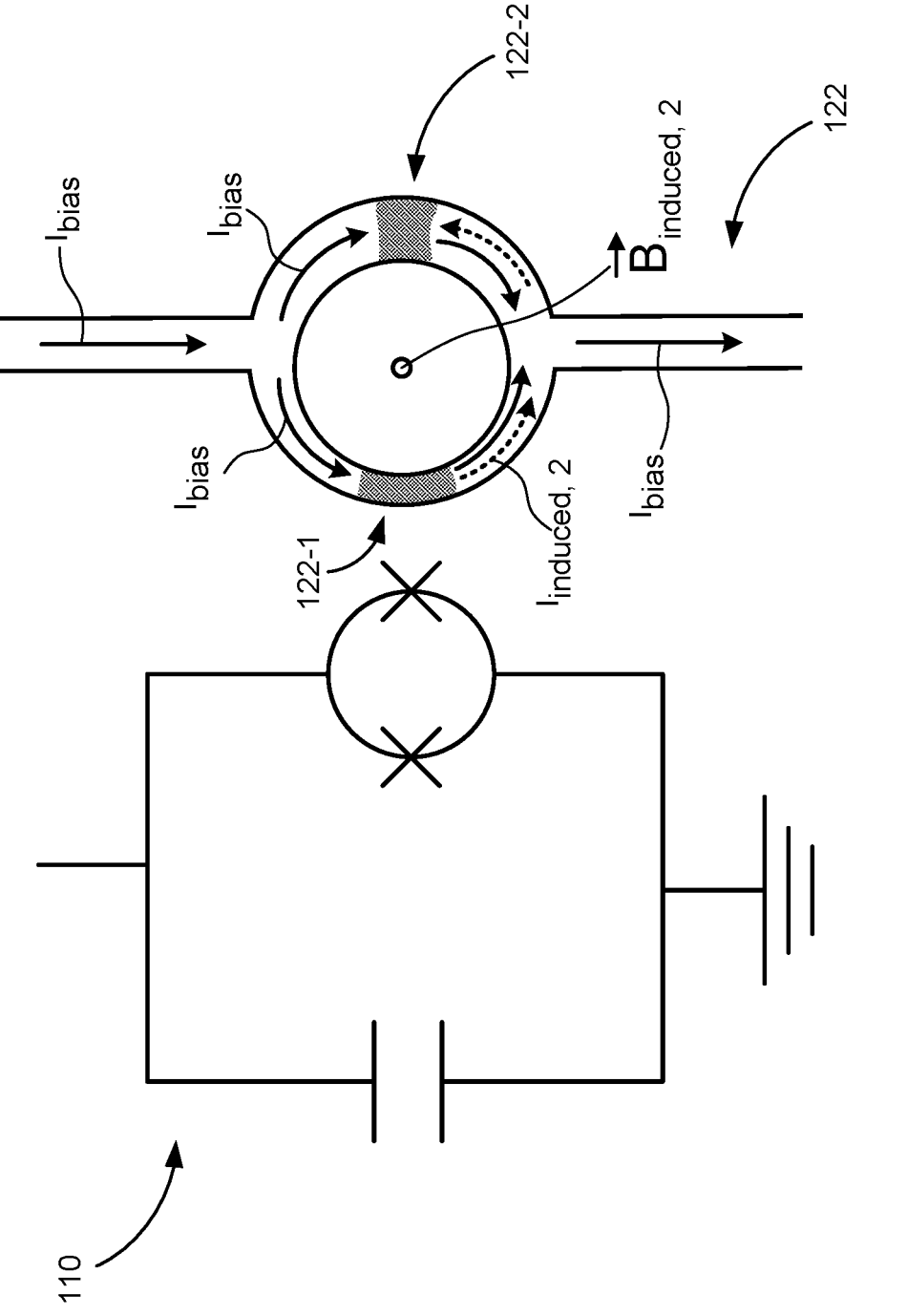

FIGS. 1B-1F are circuit diagrams illustrating operation of the detection circuit shown in FIG. 1A in accordance with some embodiments. In these embodiments, the superconducting component 122 is maintained at a temperature below the threshold temperature of the superconducting component 122, and state changes in the superconducting component 122 discussed with respect to FIGS. 1C, 1D and 1E are due to currents in portions of the superconducting component 122 that change (e.g., increase) so as to exceed, or change (e.g., decrease) so as not to exceed, a current density threshold of the superconducting component 122.

Referring to FIG. 1B, the superconducting component 122 is configured to receive a bias current (e.g., an input current), denoted in FIG. 1B as $I_{bias}$. The bias current ($I_{bias}$) is below the threshold current of the superconducting component 122 such that the superconducting component 122 remains in a superconducting state while carrying (e.g., transmitting) the bias current ($I_{bias}$) and while the superconducting component 122 is maintained at a temperature below the threshold temperature of the superconducting component 122. As shown in FIG. 1B, the superconducting component 122 has a narrow portion 122-1 and a wide portion 122-2. It is noted that because the narrow portion 122-1 has a narrower cross-section than the wide portion 122-2, a smaller amount of current is sufficient to transition that portion 122-1 to the normal state than the amount of current needed to transition the wide portion 122-2 to the normal state.

FIG. 1C illustrates operation of superconducting component 122, of detection circuit 120, while the resonant circuit 110 is in the first state (e.g., first energy state, first resonant state), resonant circuit 100 has a first magnetic flux corresponding to the first state, and the superconducting component 122 is maintained at a temperature below the threshold temperature of the superconducting component 122. In FIG. 1C, as in FIG. 1B, the superconducting component 122 is located (e.g., disposed) adjacent to and coupled (e.g., inductively coupled) with the resonant circuit 110. As a result, the superconducting component 122 carries a first flux-induced current that is induced by the first magnetic flux of the resonant circuit 110. The first magnetic flux is denoted in FIG. 1C as $B_{induced,1}$ and the first flux-induced current and is denoted in FIG. 1C as $I_{induced,1}$. In some embodiments, the first flux-induced current ($I_{induced,1}$) travels (e.g., flows) in the opposite direction as the bias current ($I_{bias}$) in the narrow portion 122-1 of the superconducting component 122 such that the combination of the bias current and the first flux-induced current ($I_{bias}-I_{induced,1}$) in the narrow portion 122-1 of the superconducting component 122 is below (e.g., does not exceed) the threshold current of the superconducting component 122 and/or produces a current density in that portion 122-1 of the superconducting component 122 that is below (e.g., does not exceed) a threshold current density of the superconducting component 122. Thus, the portion 122-1 of the superconducting component 122 remains in the superconducting state while simultaneously carrying (e.g., transmitting) the bias current ($I_{bias}$) and the first flux-induced current ($I_{induced,1}$).

At the same time, the first flux-induced current a ($I_{induced,1}$) travels (e.g., flows) in the same direction as the bias current ($I_{bias}$) in the wide portion 122-2 of the superconducting component 122. However, due to the width (or cross-section) of wide portion 12202, the combination of the bias current and the first flux-induced current ($I_{bias}+I_{induced,1}$) in the wide portion 122-2 of the superconducting component 122 is below (e.g., does not exceed) the threshold current of the superconducting component 122 and/or produces a current density in that portion 122-2 of the superconducting component 122 that is below (e.g., does not exceed) a threshold current density of the superconducting component 122. Since neither the narrow nor wide portion of the superconducting component 122 have currents exceeding a threshold current of the superconducting component 122, the superconducting component 122 remains in the superconducting state while the resonant circuit is in the first state.

FIG. 1D illustrates operation of superconducting component 122, of detection circuit 120, while the resonant circuit 110 is in a second state (e.g., second energy state, second resonant state), different from the first state. It is noted that the resonant circuit 110 has a second magnetic flux, different from the first magnetic flux, while the resonant circuit 110 is in the second state. The superconducting component 122 is located (e.g., disposed) adjacent to and coupled (e.g., inductively coupled) with the resonant circuit 110 so that the superconducting component 122 carries a second flux-induced current that is induced by the second magnetic flux of the resonant circuit 110. The second magnetic flux (e.g., the magnetic flux associated with the state of the resonant circuit 110, but at the location of the superconducting component 122) is denoted in FIG. 1D as $B_{induced,2}$ and the second flux-induced current and is denoted in FIG. 1D as $I_{induced,2}$. In some embodiments, such as when the resonant circuit 110 is a transmon superconducting qubit, the second state may correspond to an excited state (e.g., a qubit excitation state), while a first state of the resonant circuit 110 may correspond to a non-excited state (e.g., a qubit ground state), or vice versa.

In this example, while the resonant circuit 110 is in the second state, the induced magnetic flux ($B_{induced,2}$) corresponding to the second flux-induced current ($I_{induced,2}$) is directed out of the page, and the second flux-induced current ($I_{induced,2}$) travels (e.g., flows) in a same direction as the bias current ($I_{bias}$) in the narrow portion 122-1 of the superconducting component 122, but travels (e.g., flows) in the opposite direction as the bias current in another portion 122-2 (e.g., the wide portion 122-2). As a result, in this example, while the resonant circuit 110 is in the second state, the bias and induced current are additive (e.g., travel in the same direction) in the narrow portion 122-2, but subtractive (e.g., travel in opposite directions) in the wide portion 122-2 of the superconducting component 122.

Still referring to FIG. 1D, the combination of the bias current and the first flux-induced current ($I_{bias}+I_{induced,2}$) in the narrow portion 122-1 exceeds the threshold current of the superconducting component 122 (e.g., the current density in the narrow portion 122-1 exceeds a current density threshold of the superconducting component 122), and thus, even while the superconducting component 122 is maintained at a temperature below the threshold temperature, the narrow portion 122-2 of the superconducting component 122 transitions from the superconducting state to the normal state. At least for a brief instant in time, while the narrow portion 122-1 is transitioning to the normal state, the wide portion 122-2 may remain in the superconducting state, so long as the current density in the wide portion 122-2 does not exceed a current density threshold of the superconducting component.

In FIGS. 1C, 1D and 1E, the portions of superconducting component 122 in the normal state are represented by shaded regions, while the portions of superconducting component 122 in the superconducting state are unfilled or unshaded (e.g., represented by white space between the lines representing the superconducting component's physical perimeter).

FIG. 1E represents the same physical configuration of components as FIG. 1D, with the resonant circuit 110 still in the second state, but at a second time later (e.g., 1 to 20 picoseconds later) than a first time corresponding to FIG. 1D. As represented by FIG. 1E, the transition of the narrow portion 122-1 of the superconducting component 122 to the normal state (as shown in FIG. 1D), causes most (e.g., all, virtually all, at least 99%) of the bias current ($I_{bias}$) to flow through the wide portion 122-2 of the superconducting component 122. Stated another way, the increase in resistance of the narrow portion 122-1 causes the portion of the bias current that was flowing through the narrow portion 122-1 to flow through the wide portion 122-2 instead, so long as the wide portion 122-2 is in the superconducting state and has zero resistance. In this example, the resulting current (e.g., $I_{bias}-I_{induced,2}$) in the wide portion 122-2 superconducting component 122 has a current density that exceeds a current density threshold of the superconducting component 122, which causes the wide portion 122-2 of the superconducting component 122 to also transition to the normal state. This is sometimes herein called a cascading effect or cascading transition of the superconducting component 122 to the non-superconducting state. In some embodiments, the entire superconducting component 122 may transition to the non-superconducting state in response to the portion 122-1 of the superconducting component 122 transitioning to the non-superconducting state.

It is noted that while the induced current is represented by the same symbol, $I_{induced,2}$, in both FIGS. 1D and 1E, the magnitude of the induced current may change (e.g., be reduced) when both portions 122-1 and 122-2 of the superconducting component 122 transition to the normal state, due to a large increase in resistance of the superconducting component (e.g., from zero to a resistance greater than 1 kOhm, or greater than 100 kOhm).

In the examples discussed above, the first flux-induced current flows clockwise through the superconducting component 122, which aligns with the direction of the bias current in the wide portion 122-2 and is opposite the direction of the bias current in the narrow portion 122-1 of the superconducting component 122; and the second flux-induced current flows counterclockwise through the superconducting component 122, which aligns with the direction of the bias current in the narrow portion 122-1 and is opposite the direction of the bias current in the wide portion 122-2 of the superconducting component 122. However, even if the bias current were in the opposite direction, and/or the magnetic flux associated with the first and second states of the resonant circuit had the opposite directions from that described above, the superconducting component 122 would be in the superconducting state (e.g., having zero or substantially zero resistance) when the resonant circuit 110 is in one state and would be in the normal state (e.g., having a resistance much greater than zero, such as greater than 100 kOhm) when the resonant circuit 110 is in the other state, and thus the resistance of superconducting component 122 indicates the state of resonant circuit 110.

Figure 1F:
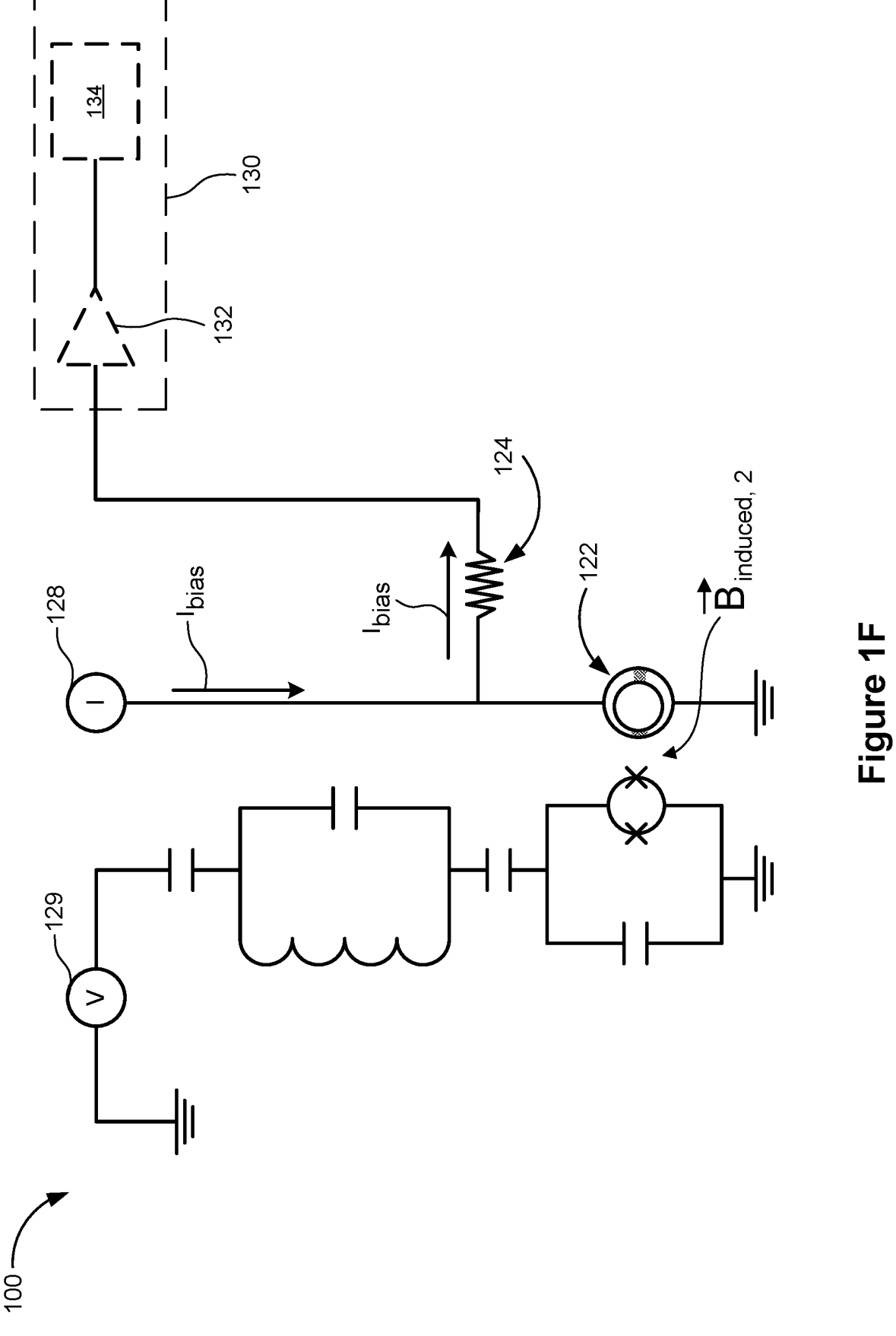

Referring to FIG. 1F, in response to at least a portion of the superconducting component 122 (e.g., portion 122-1, portions 122-1 and 122-2, or the entire superconducting component 122) transitioning to the non-superconducting state (e.g., when the resonant circuit is in the second state, as described above with reference to FIGS. 1C-1D), the impedance (and/or resistance) of the superconducting component 122 is greater than an impedance (and/or resistance) of the impedance component 124 and thus at least a portion of the bias current ($I_{bias}$) is transmitted via the impedance component 124 instead of the superconducting component 122. In some embodiments, such as when the impedance component 124 is coupled to (e.g., connected to) a circuit 130 (e.g., a readout circuit), the circuit 130 receives at least a portion of the bias current ($I_{bias}$) (e.g., from a current source 128) and provides an indication (e.g., a signal) that the resonant circuit 110 is in the second state.

In response to the bias current ($I_{bias}$) being redirected (e.g., rerouted) through the impedance component 124, the superconducting component 122 receives a smaller portion of the bias current ($I_{bias}$) (and in some cases, ceases to receive any portion of the bias current ($I_{bias}$)), and the total current carried in the superconducting component 122 and/ or the current density in any portion of the superconducting component 122 drops below the threshold current and/or the threshold current density. Thus, the superconducting component 122 transitions (e.g., returns) to the superconducting state provided that the superconducting component 122 is maintained at a temperature below the threshold temperature. The superconducting component 122 is able to transition back to the superconducting state in the absence of at least a portion of the bias current ($I_{bias}$) since the first flux-induced current ($I_{induced,1}$) and the second flux-induced current a ($I_{induced,2}$) are each below the threshold current of the superconducting component 122 and are not able to, without the addition of at least a portion of the bias current ($I_{bias}$), cause any portion of the superconducting component 122 to have a current density that exceeds the threshold current density. In some embodiments, the bias current is modulated at a frequency, or with a modulation pattern, that prevents superconducting component 122 from transitioning back and forth between the superconducting state and normal state at the same frequency as resonant circuit 110, and the signal received at circuit 130 is demodulated, e.g., by data acquisition component 134, to compensate for the modulation of the bias current.

Figure 2:
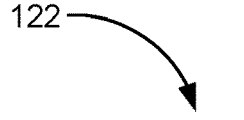
FIG. 2 is a schematic diagram illustrating a superconducting component of the detection circuit shown in FIGS. 1A-1F in accordance with some embodiments.
Figure 2:
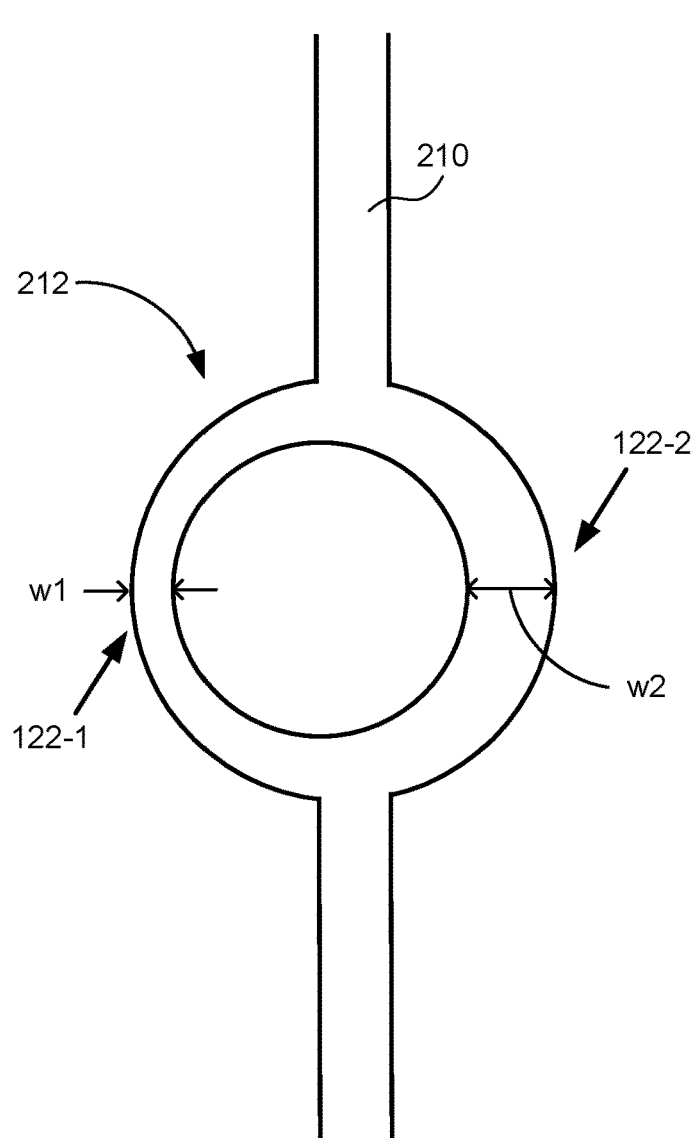

FIG. 2 is a schematic diagram illustrating the superconducting component 122 of the detection circuit 120 shown in FIGS. 1A-1F in accordance with some embodiments. In some embodiments, as shown, the superconducting component 122 includes a loop 212. In some embodiments, the superconducting component 122 includes a superconducting wire 210 that forms the loop 212. In some embodiments, the superconducting wire 210 (e.g., a wire made of a superconducting material) has an asymmetrical width such that a first portion of the wire 210, corresponding to portion 122-1 of the superconducting component 122, has a first width ($w_1$), and a second portion of the wire 210, corresponding to portion 122-2 of the superconducting component 122, has a second width ($w_2$) that is greater (e.g., larger) than the first width ($w_1$).

In some embodiments, the smaller width ($w_1$) in the first portion 122-1 of the superconducting component causes current crowding to occur in the first portion 122-1 such that for a same electrical current, a current density in the portion 122-1 is higher (e.g., greater, larger) than a current density in the second portion 122-2 of the superconducting component 122. Thus, while the superconducting component 122 carries a current such that the second portion 122-2 of the superconducting component 122 has a current density that is below the threshold current density, the current density at the first portion 122-1 of the superconducting component 122 may exceed the threshold current at the same time that the current density in the second portion 122-2 does not exceed the threshold current. While the superconducting component 122 remains in the superconducting state, the ratio of the current density observed at the first portion 122-1 having the first width ($w_1$) compared to the current density observed at the second portion 122-2 having the second width ($w_2$) corresponds to (e.g., is proportional to, or more generally is a function of) the ratio of the second width ($w_2$) to the first width ($w_1$). Thus, a larger ratio between the second width ($w_2$) and the first width ($w_1$) results in a more sensitive device, since a smaller amount of current is required for the current density in the portion 122-1 of the superconducting component 122 to exceed the threshold current density of the superconducting component 122 and for the portion 122-1 of the superconducting component 122 to transition from the superconducting state to the non-superconducting state.

In some embodiments, the portion 122-1 of the superconducting component 122 having the first width ($w_1$) is located (e.g., disposed) closer to the resonant circuit 110 than the portion 122-2 of the superconducting component 122 having the second width ($w_2$). In some embodiments, this is achieved by the first portion 122-1 of the superconducting component 122 having the first width ($w_1$) being located (e.g., disposed) between the resonant circuit 110 and the portion 122-2 of the superconducting component 122 having the second width ($w_2$). In some other embodiments, the resonant circuit 110 and the superconducting component 122 are located on different layers of the circuit, with the portion 122-1 of the superconducting component 122 having the first width ($w_1$) being located (e.g., disposed) either closer to the resonant circuit 110 than the portion 122-2 of the superconducting component 122 having the second width ($w_2$) or at substantially (e.g., within 20%) the same distance from the resonant circuit 110 as the portion 122-2 of the superconducting component 122 having the second width ($w_2$). In some embodiments, the portion 122-1 of the superconducting component 122 having the first width ($w_1$) is referred to as a constriction region or a constriction portion.

In some embodiments, a subset, less than all, of the superconducting component 122 is coupled (e.g., inductively coupled) to the first resonant circuit 110. For example, the portion 122-2 (e.g., the constriction region) of the superconducting component 122 is coupled to the resonant circuit 110 while at least some other portions of the superconducting component 122 are not coupled to the resonant circuit 110. In another example, portions of the superconducting component 122 that correspond to the loop 212 formed by wire 210 are coupled (e.g., inductively coupled) to the first resonant circuit 110 while at least some other portions of the superconducting component 122 are not coupled to the resonant circuit 110.

Figure 3:
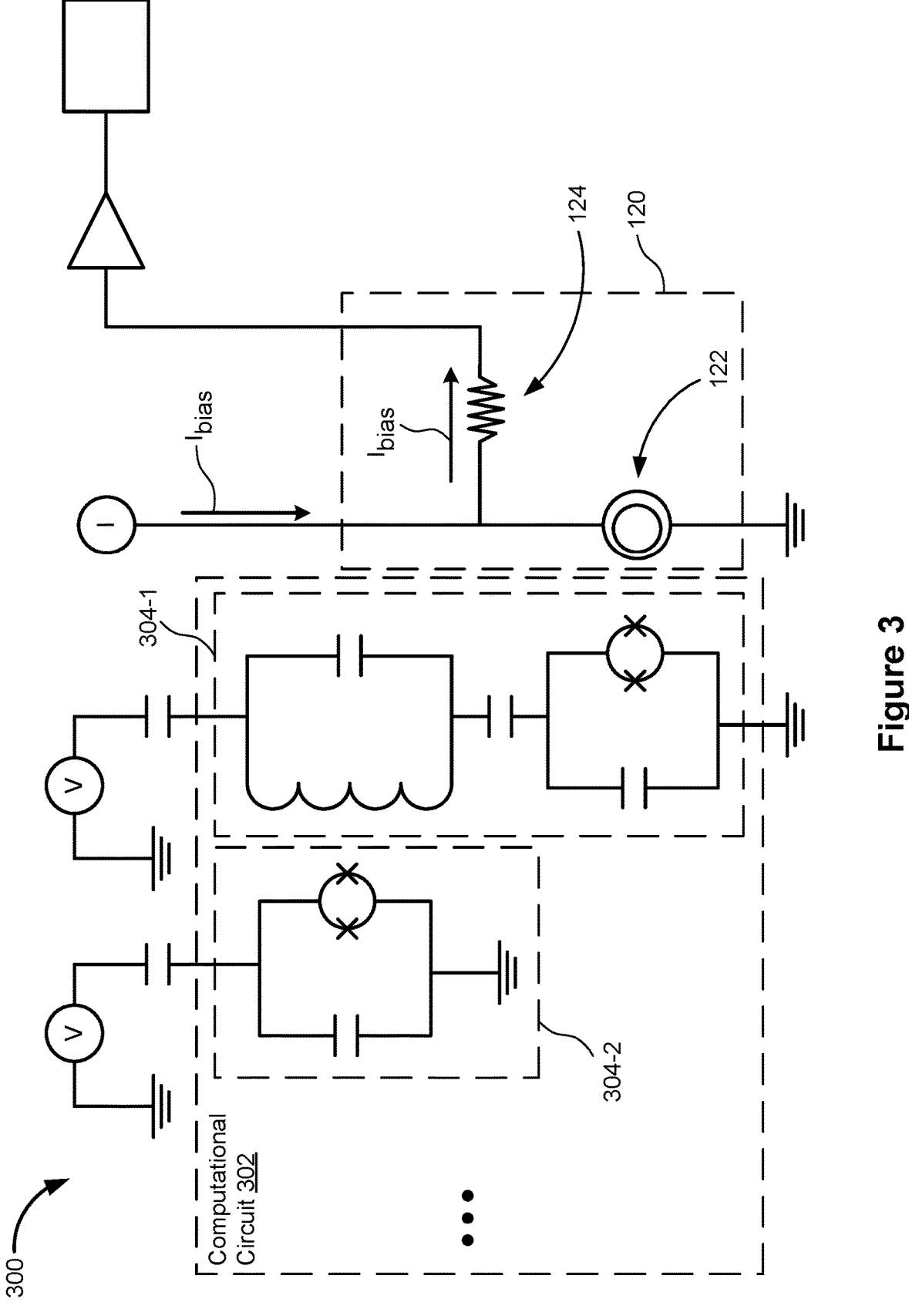
FIG. 3 is a circuit diagram illustrating a computational circuit having a plurality of resonant circuits, and a detection circuit, in accordance with some embodiments.

FIG. 3 is a circuit diagram illustrating a circuit 300 that includes a computational circuit 302 (e.g., a quantum computational circuit) that has a plurality of resonant circuits 304-1, 304-2, etc. (e.g., qubit circuits), in accordance with some embodiments. In some embodiments, resonant circuit 304-1 may correspond to resonant circuit 110 and thus, the description provided above with respect to resonant circuit 110 in FIGS. 1A-1F applies to resonant circuit 304-1. The circuit diagram in FIG. 3 is a conceptual representation of the relationship between the different circuits and circuit components in circuit 300, and is not necessarily a representation of physical relationships between the circuits and circuit components of circuit 300.

In some embodiments, the computational circuit 302 is a quantum computational circuit that produces, for a given computation, a set of output states (e.g., qubit states). In some embodiments, two or more resonant circuits are coupled to one another such that states (e.g., qubit states) of the coupled resonant circuits are coupled to one another and the coupled resonant circuits exhibit quantum entanglement (e.g., a state of the resonant circuit 304-1 is entangled with a state of the resonant circuit 304-2). For example, resonant circuits 304-1 and 304-2 may be coupled to one another such that when resonant circuit 304-1 is in the first state, resonant circuit 304-2 is in the second state, and vice versa. In some embodiments, the resonant circuits 304-1 and 304-2 are coupled to one another via a cavity. Alternatively, the resonant circuits 304-1 and 304-2 may be capacitively coupled to one another. In another example, the first resonant circuit 304-1 and second resonant circuit 304-2 are transmon superconducting qubits, and the transmon of the second resonant circuit 304-2 is entangled with the transmon of the first resonant circuit 304-1.

Detection circuit 120 (e.g., a detector) is coupled to a respective resonant circuit (e.g., resonant circuit 110) in the computational circuit 302 and is configured to detect or facilitate detection of a state of the respective resonant circuit in the computational circuit 302. In some embodiments, circuit 300 includes a plurality of detector circuits 120 (e.g., detectors) that are each coupled to a corresponding resonant circuit 304 of the computational circuit 302, and are configured to detect or facilitate detection of a state of the corresponding resonant circuit. In some embodiments, the number of detectors 120 is equal to the number of resonant circuits 304 in the computational circuit 302, while in other embodiments the number of detectors 120 is less than the number of resonant circuits 304 in the computational circuit 302, and thus the detectors 120 are coupled to a subset, less than all, of the resonant circuits 304 in the computational circuit 302.

Figure 4:
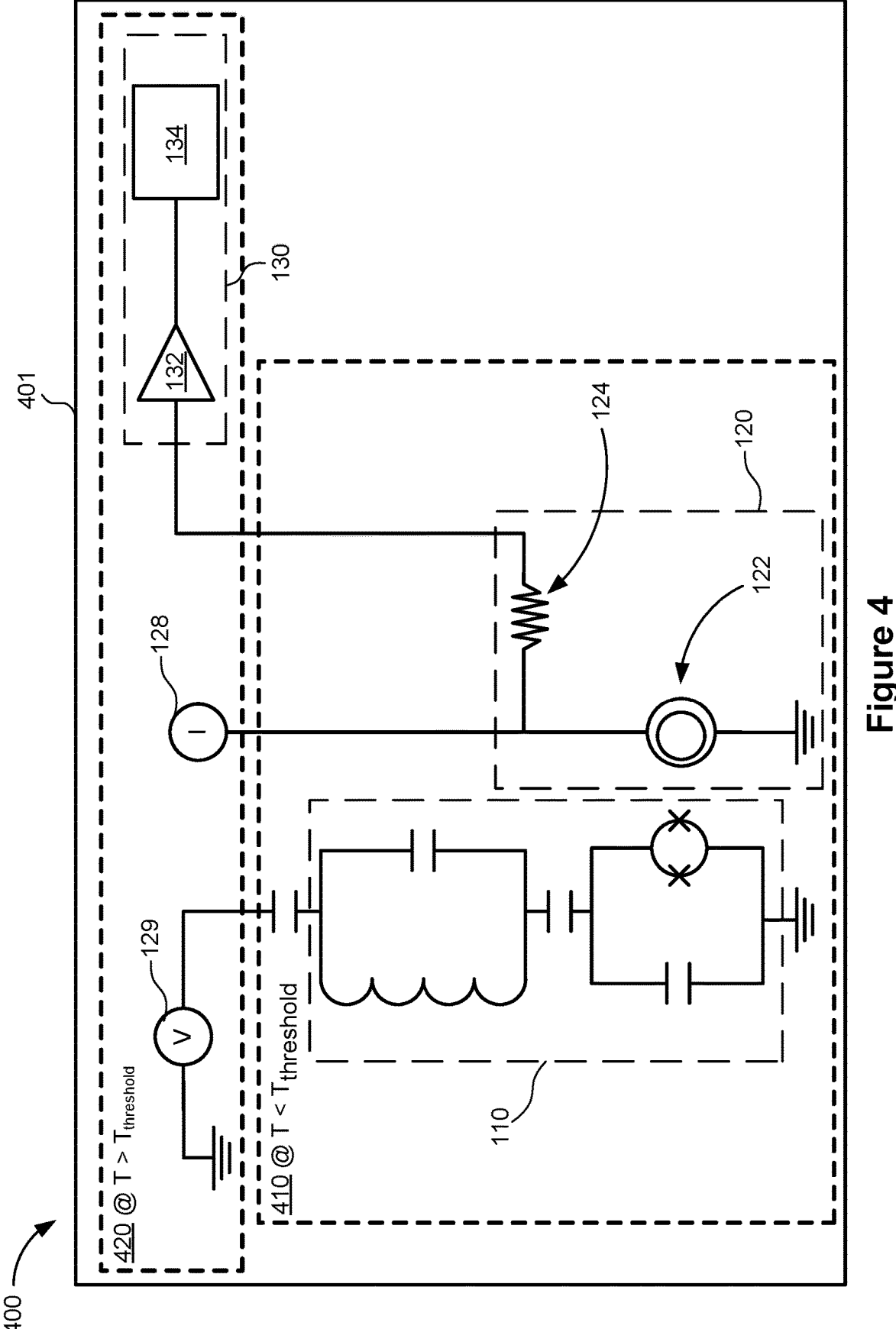
FIG. 4 is a schematic diagram representing an on-chip circuit in accordance with some embodiments.

FIG. 4 is a schematic diagram representing an on-chip circuit 400 in accordance with some embodiments. The chip includes a first portion 410 that is maintained at a temperature below a threshold temperature of superconducting component 122 (e.g., $T < T_{threshold}$) and a second portion 420 that can be maintained at a temperature above the threshold temperature of superconducting component 122 (e.g., $T > T_{threshold}$). For example, in some implementations, the threshold temperature of the superconducting component 122 is approximately 12 Kelvin (e.g., plus or minus 20%), and the first portion 410 of the chip 401 is maintained at approximately 4 Kelvin (e.g., plus or minus 1 Kelvin) and the second portion 420 of the chip 401 is maintained at temperature of 50 to 300 Kelvin.

The on-chip circuit 400 corresponds to circuit 100 (shown in FIG. 1A) and includes resonant circuit 110 and detection circuit 120. In some embodiments, as shown in FIG. 4, the resonant circuit 110 and the detection circuit 120 (including the superconducting component 122) are formed on the same chip (e.g., a same substrate). In some embodiments, the resonant circuit 110 and the detection circuit 120 (including the superconducting component 122) are located on the first portion 410 of the chip 401 while other components of the circuit 400 that do not include superconducting materials (e.g., voltage source 129, current source 128, ground, amplifier(s) (e.g., amplifier(s) 132), data acquisition component 134) are located on the second portion 420 of the chip 401. By placing superconducting components of circuit 400 on the first portion 410 of the chip 401, the chip 401 only needs to maintain the first portion 410 below a threshold temperature of the superconducting component(s) and the rest of the chip 401 can be maintained (or allowed to operate) at a higher temperature.

Figure 5:
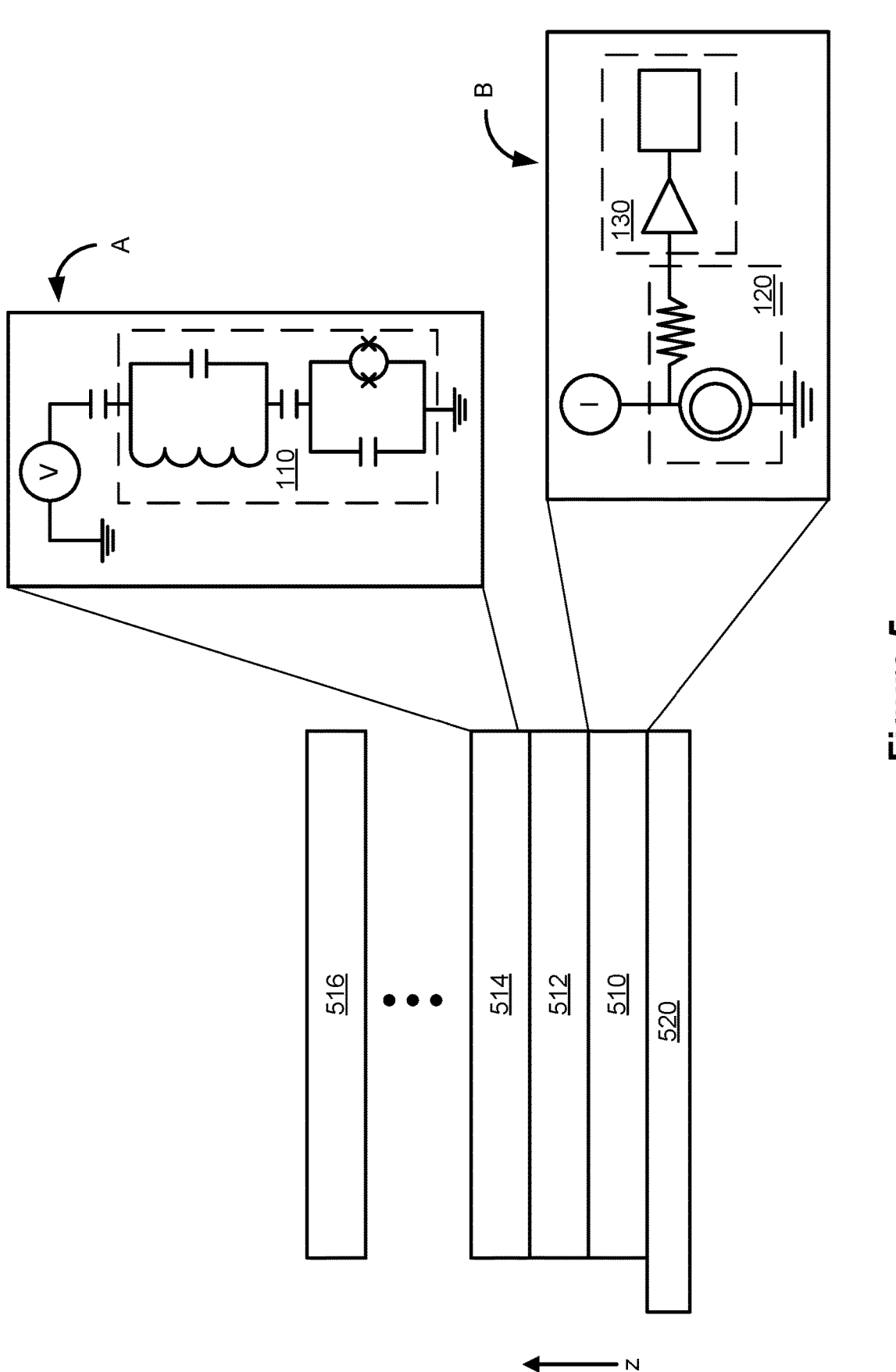
FIG. 5 is a side plan view illustrating a layering of the circuit (e.g., of FIG. 1A or FIG. 4) in accordance with some embodiments.

FIG. 5 is a side plan view illustrating layering of circuit 100 in accordance with some embodiments. Circuit 100 may be formed in a stacked configuration where different components of circuit 100 are formed on different layers of a multilayer circuit structure. For example, as shown in inset A and inset B of FIG. 5, components of the detection circuit 120 of circuit 100 are formed on a first layer 510, and components of the resonant circuit 110 of circuit 100 are formed on a second layer 514 that is distinct and separate from layer 510. When circuit 100 is formed in a stacked configuration, as shown, the superconducting component 122 of the detection circuit 120 overlaps with at least a portion of the resonant circuit 110 in the z-direction such that the superconducting component 122 is coupled (e.g., inductively coupled) to the resonant circuit 110. In some embodiments, by forming the resonant circuit 110 and the detection circuit 120 in separate layers so that the superconducting component 122 can overlap with at least a portion of the resonant circuit 110, the distance between the superconducting component 122 and the resonant circuit 110 can be reduced compared to a side-by-side configuration where the between the superconducting component 122 and the resonant circuit 110 are formed on a same layer. The reduced distance between the superconducting component 122 and the resonant circuit 110 results in improved coupling efficiency and thus, can improve the overall accuracy and reliability of circuit 100 in qubit detection.

In some embodiments, a third layer 512 is located (e.g., disposed) between layers 510 and 514 such that the components of the detection circuit 120 and the components of the resonant circuit 110 are spaced apart by at least the thickness of layer 512. For example, layer 512 may be a dielectric layer (e.g., a layer that includes a dielectric material, optionally having a thickness less than 500 nm) that is configured to facilitate coupling (e.g., inductive coupling) between the superconducting component 122 and the resonant circuit 110. The thickness and material of layer 512 may improve inductive coupling between the resonant circuit 110 and the superconducting component 122.

In some embodiments, circuit 100 may be part of an electronic device and thus, the electronic device may include additional layers, such as layer 516. In some embodiments, layers of the electronic device, including the layers 510, 512, and 514 may be formed on a same substrate 520. The different layers may be formed in a different order than shown. For example, the resonant circuit 110 may be formed on layer 510 and the detection circuit 120 may be formed on layer 514. In some embodiments, additional layers 516 may be located between the substrate 520 and layer 510.

In addition to improved inductive coupling between the resonant circuit 110 and the detection circuit 120, forming circuit 100 in a stacked configuration can also provide a compact footprint for circuit 100 and reduce a surface area that needs to be maintained below a threshold temperature of superconducting component(s) (such as superconducting component 122 and any additional superconducting components in resonant circuit 110) in the circuit 100.

Figure 6A:
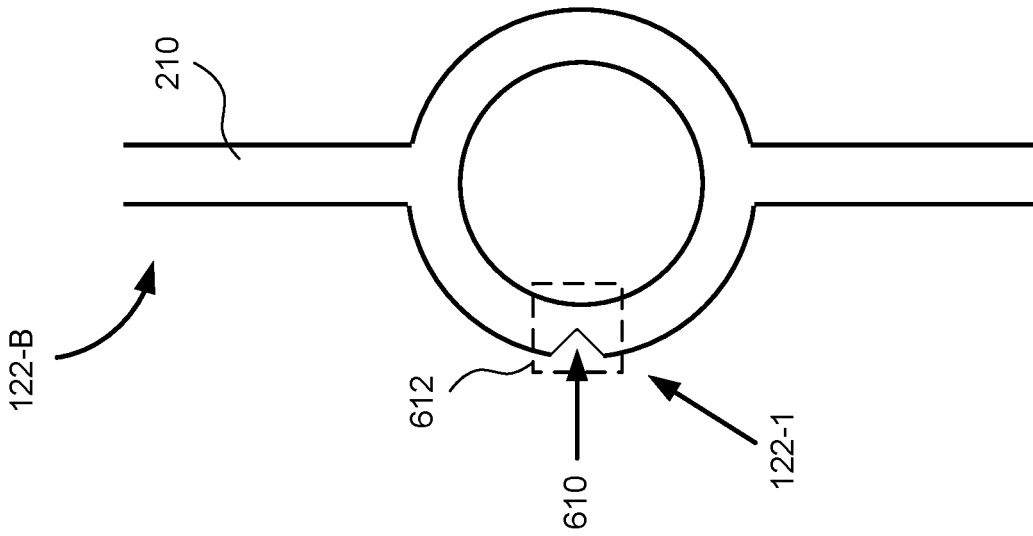
FIGS. 6A and 6B illustrate different geometries of a superconducting component of the detection circuit shown in FIGS. 1A-1F in accordance with some embodiments.
Figure 6A:
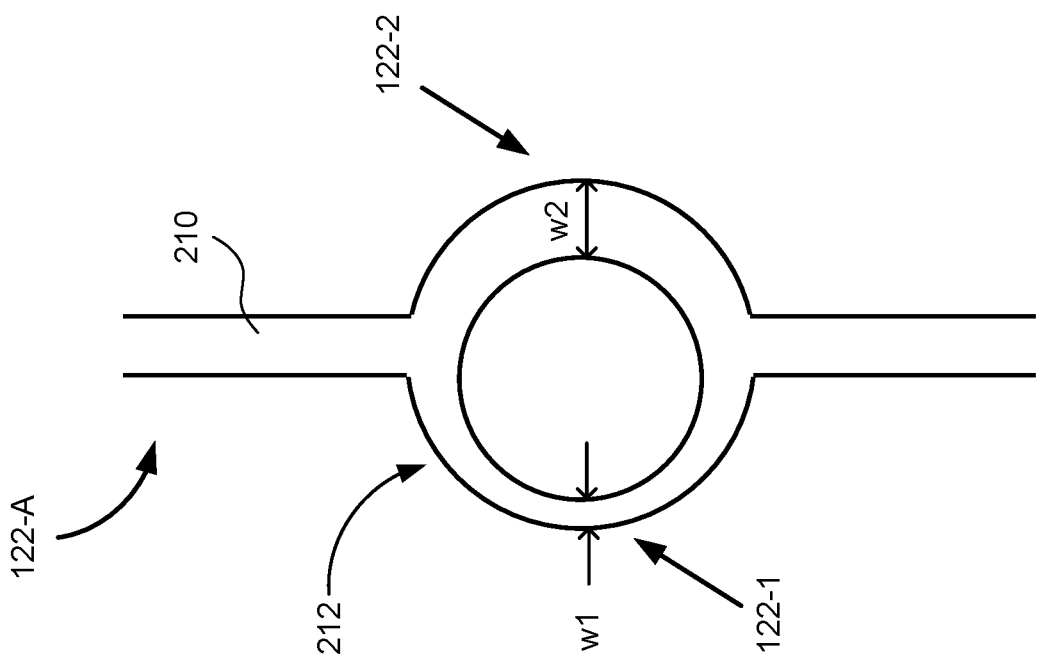
Figure 6B:
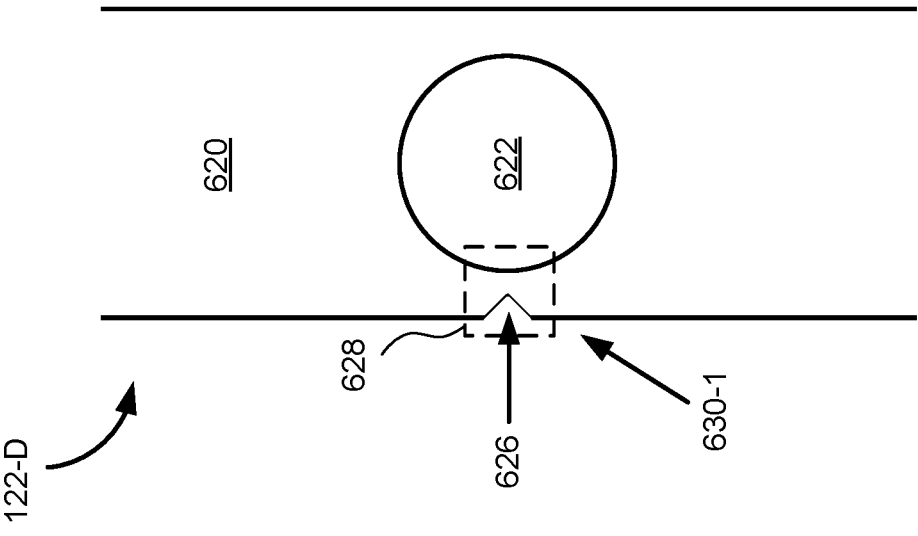
Figure 6B:
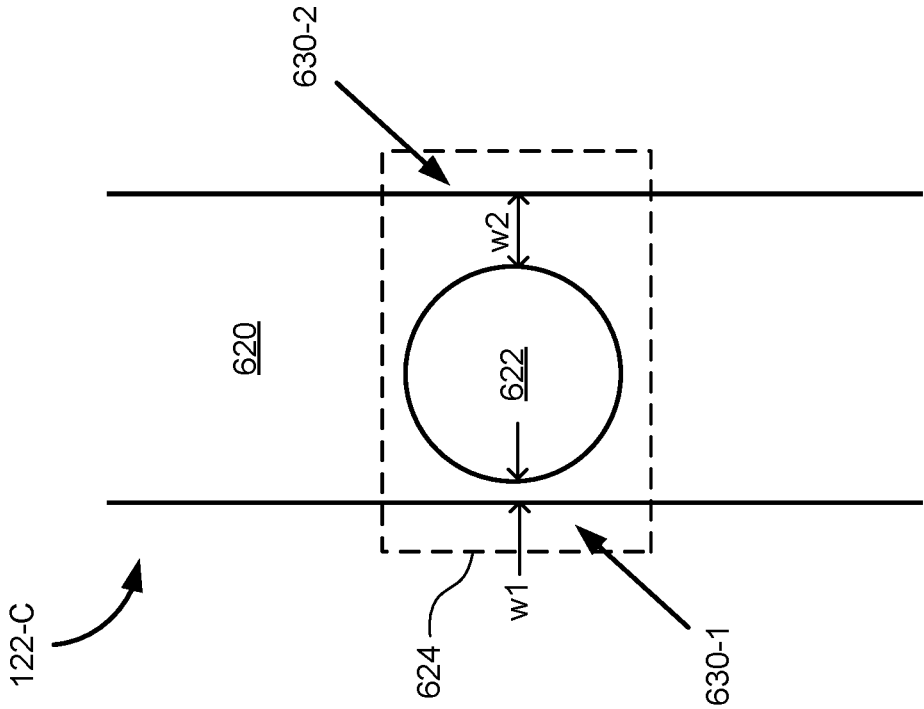

FIGS. 6A and 6B illustrate different geometries of a superconducting component 122 in accordance with some embodiments. Superconducting component 122-A, shown in FIG. 6A, has a same geometry as the superconducting component 122 shown in FIG. 2. In this embodiment, the superconducting component 122-A includes a superconducting wire 210 that forms a loop 212. In some cases, as shown, the loop 212 has an asymmetrical width such that the superconducting component 122 has a first width ($w_1$) in a first portion 122-1 and a second width ($w_2$), that is larger than the first width, in a second portion 122-2. Superconducting component 122-B has a similar geometry to superconducting component 122-A except that superconducting component 122-B includes an indent 610 in the first portion 122-1 of the superconducting component 122. The indent 610 creates a constriction region 612 that further increases the current density in the first portion 122-1 of the superconducting component 122 relative to other portions of the superconducting component 122. In some embodiments, except for constriction region 612, superconducting wire 210 of superconducting component 122-B has uniform width, or more uniform with than in superconducting component 122-A.

Referring to FIG. 6B, superconducting component 122-C includes a superconducting wire 620 that has a cavity 622, thereby forming superconducting wire 620 as a loop 624. In some embodiments, the cavity 622 is offset from a center of the superconducting wire 620 such that the superconducting wire 620 has a first width ($w_1$) in a first portion 630-1 and a second width ($w_2$), that is larger than the first width ($w_1$), in a second portion 630-2 of the superconducting wire 620. Superconducting component 122-D has a similar geometry to superconducting component 122-C except that superconducting component 122-D includes an indent 626 in the first portion 630-1 of the superconducting wire 210. The indent 626 creates a constriction region 628 that further increases the current density in the first portion 630-1 of the superconducting wire 620 relative to other portions of the superconducting wire 620. In some embodiments, the cavity 622 of superconducting wire 620 of superconducting component 122-C is positioned at (or substantially at) the center of the superconducting wire 620, but indent 626 still creates a constriction region 628 that increases the current density in the first portion 630-1 of the superconducting wire 620 relative to other portions of the superconducting wire 620.

Figure 7:
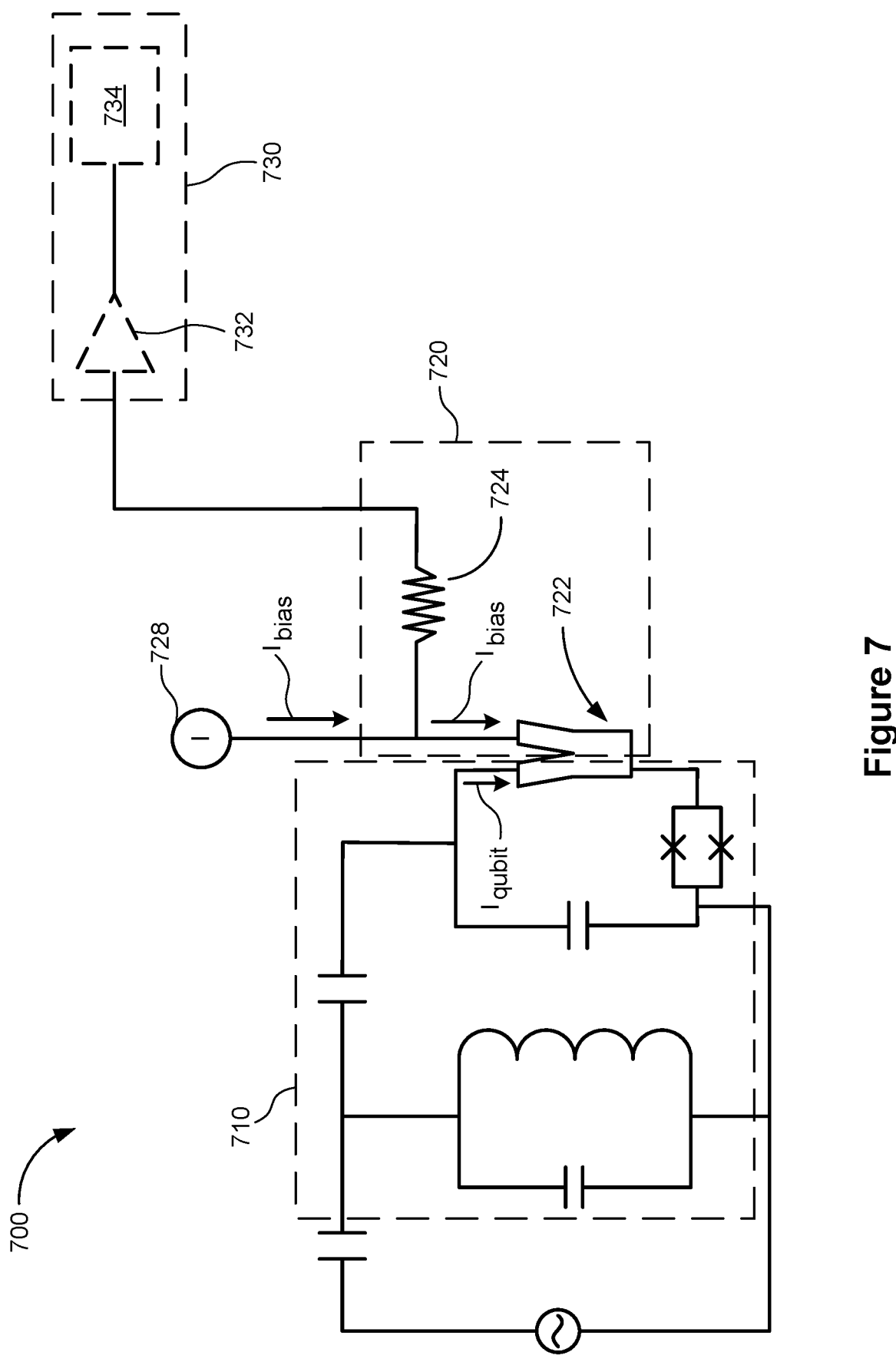
FIG. 7 is a circuit diagram illustrating a resonant circuit and a detection circuit in accordance with some embodiments.

FIG. 7 is a circuit diagram illustrating a circuit 700 that includes a resonant circuit 710 and a detection circuit 720 in accordance with some embodiments. In some embodiments, the resonant circuit 710 is a superconducting qubit (e.g., transmon superconducting qubit) that can have a plurality of states (e.g., energy states, qubit states). In such cases, the state of the resonant circuit 710 determines the state of the superconducting qubit. The detection circuit 720 includes a superconducting component 722 and an impedance component 724. The resonant circuit 710 also includes at least a portion of the superconducting component 722 such that current carried in the resonant circuit 710 is transmitted through at least a portion of the superconducting component 722 when the superconducting component 722 is in a superconducting state. The superconducting component 722 has a threshold temperature and a threshold current density above which the superconducting component 722 transitions from a superconducting state to a non-superconducting state. The superconducting component 722 has a lower impedance (e.g., zero, or approximately zero impedance) than the impedance component 724 while the superconducting component 722 is in the superconducting state (e.g., zero impedance in the superconducting state), and a higher impedance than the impedance component 724 while the superconducting component 722 is in the non-superconducting state. Using the superconducting transition properties of superconducting component 722 and the relative impedances of the impedance component 724 and the superconducting component 722 in the superconducting and non-superconducting states, the detection circuit 720 is able to redirect the transmission path of electrical current transmitted through the detection circuit 720 such that the circuit 100 can provide a readout (e.g., signal, indication) of the state of the resonant circuit 710.

In some embodiments, the impedance component 724 is coupled to a circuit 730 (e.g., a readout circuit) that may include one or more signal amplifiers 732 and/or a data acquisition component 734. In some embodiments, as shown, the impedance component 724 is coupled in parallel to the superconducting component 722 such that electrical current transmitted through the detection circuit 720 is transmitted via a path with the least impedance. For example, while the superconducting component 722 is in the superconducting state, electrical current (e.g., a bias current) is transmitted through the detection circuit 120 via the superconducting component 722, and no current is transmitted through the impedance component 723; alternatively, the amount of current transmitted through the impedance component 724 is much less than the amount of current transmitted through the superconducting component 722 (e.g., the amount of current transmitted through the impedance component 724 is 1% or less, or 5% or less, of the amount of current transmitted through the superconducting component 722). In contrast, while the superconducting component 722 is in the non-superconducting state, electrical current is primarily transmitted through the detection circuit 720 via the impedance component 724 (e.g., the amount of current transmitted through the impedance component 724 is at least ten (10) times more, or at least twenty (20) times more, or at least one hundred (100) times more than the amount of current transmitted through the superconducting component 722; e.g., in some implementations, superconducting component 722 has a resistance greater than 100 kOhm in the normal state, while impedance component 724 has a resistance of 1-10 kOhm).

In some embodiments, the impedance component 724 includes a resistive component that has a higher resistance than the superconducting component 722 while the superconducting component 722 is in the superconducting state and a lower resistance than the superconducting component 722 while the superconducting component 722 is in the non-superconducting state. In such cases, and when the impedance component 724 is coupled in parallel to the superconducting component 722, electrical current is transmitted through the detection circuit 720 primarily via the superconducting component 722 (e.g., at least 95% or 99% of the current is transmitted via the superconducting component 722) when the superconducting component 722 is in the superconducting state, and the electrical current is transmitted primarily via the impedance component 724 (e.g., at least 90% or 95% of the current is transmitted via the impedance component 724) while the superconducting component 722 is in the non-superconducting state.

Figure 8A:
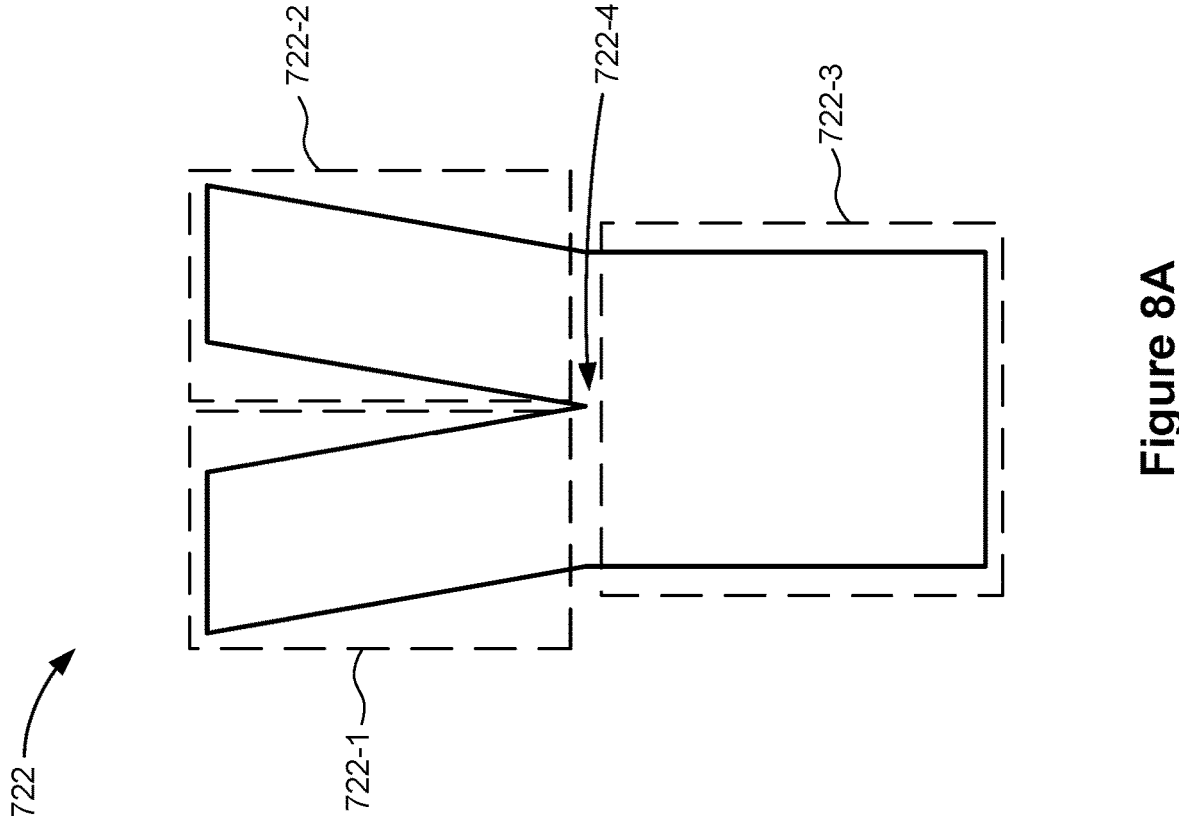
FIGS. 8A-8C are schematic diagrams illustrating a superconducting component of the detection circuit shown in FIG. 7 in accordance with some embodiments.
Figure 8B:
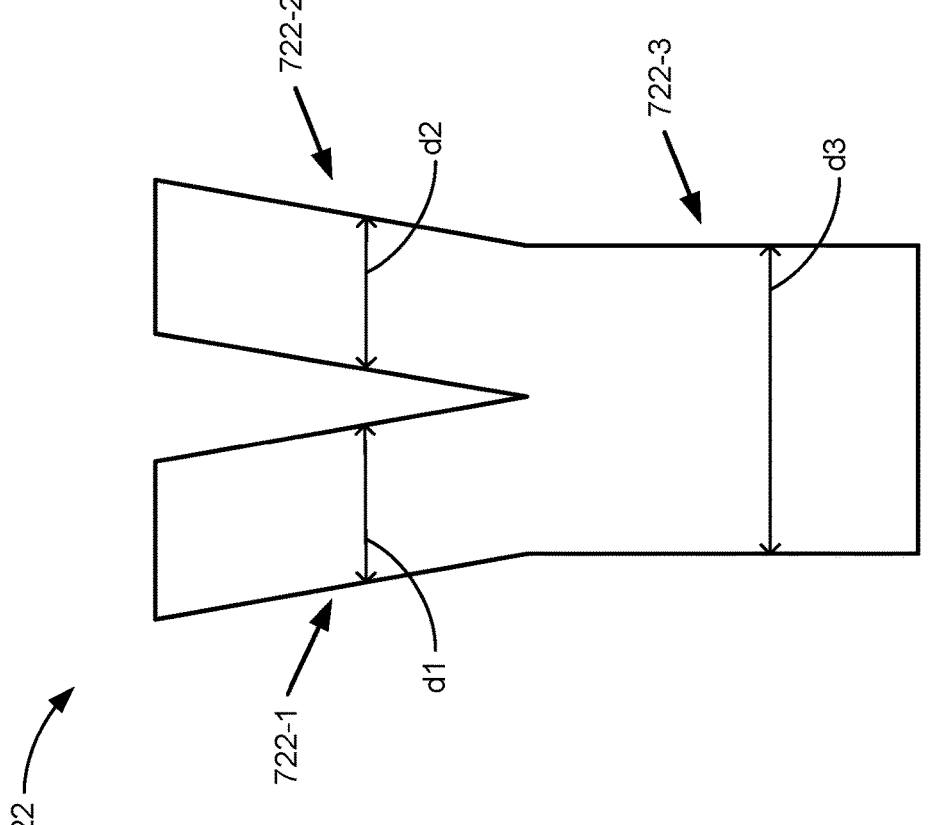
Figure 8C:
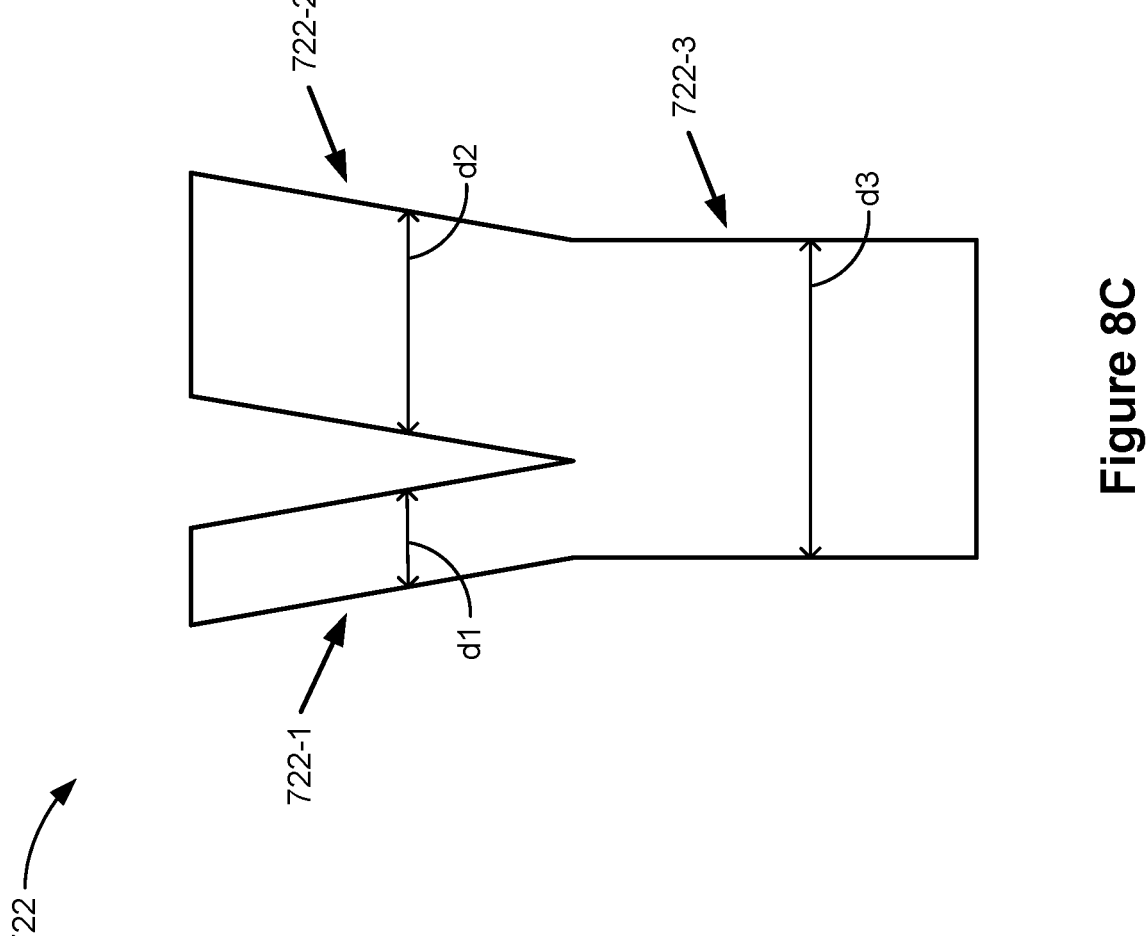

FIGS. 8A-8C are schematic diagrams illustrating a superconducting component 722 of the detection circuit 720 shown in FIG. 7 in accordance with some embodiments. As shown in FIG. 8A, superconducting component 722 includes a first portion 722-1, a second portion 722-2 that is distinct from the first portion 722-1, a third portion 722-3 that is distinct from each of the first portion 722-1 and the second portion 722-2, and a junction 722-4 joining the first, second, and third portions 722-1, 722-2, and 722-3, respectively. In some embodiments, as shown, the superconducting component 722 has a Y-shape. In such cases, the first portion 722-1 and the second portion 722-2 correspond to arms of the Y-shape, the third portion 722-3 corresponds a base of the Y-shape, and the junction 722-4 corresponds to a middle of the Y-shape that joins (e.g., connects) the arms and base of the Y-shape.

Referring to FIG. 8B, the first portion 722-1 of the superconducting component 722 has a first width ($d_1$), the second portion 722-2 of the superconducting component 722 has a second width ($d_2$), and the third portion 722-3 has a third width ($d_3$). In some embodiments, the second width ($d_2$) that is the same as the first width ($d_1$). Alternatively, as shown in FIG. 8C, the first width ($d_1$) of the first portion 722-1 may be smaller than the second width ($d_2$). In some embodiments, the third width ($d_3$) is at least the same or larger than the second width ($d_2$). In some embodiments, the third width ($d_3$) is at least the same or larger than a sum of the first width ($d_1$) and the second width ($d_2$).

Figure 9A:
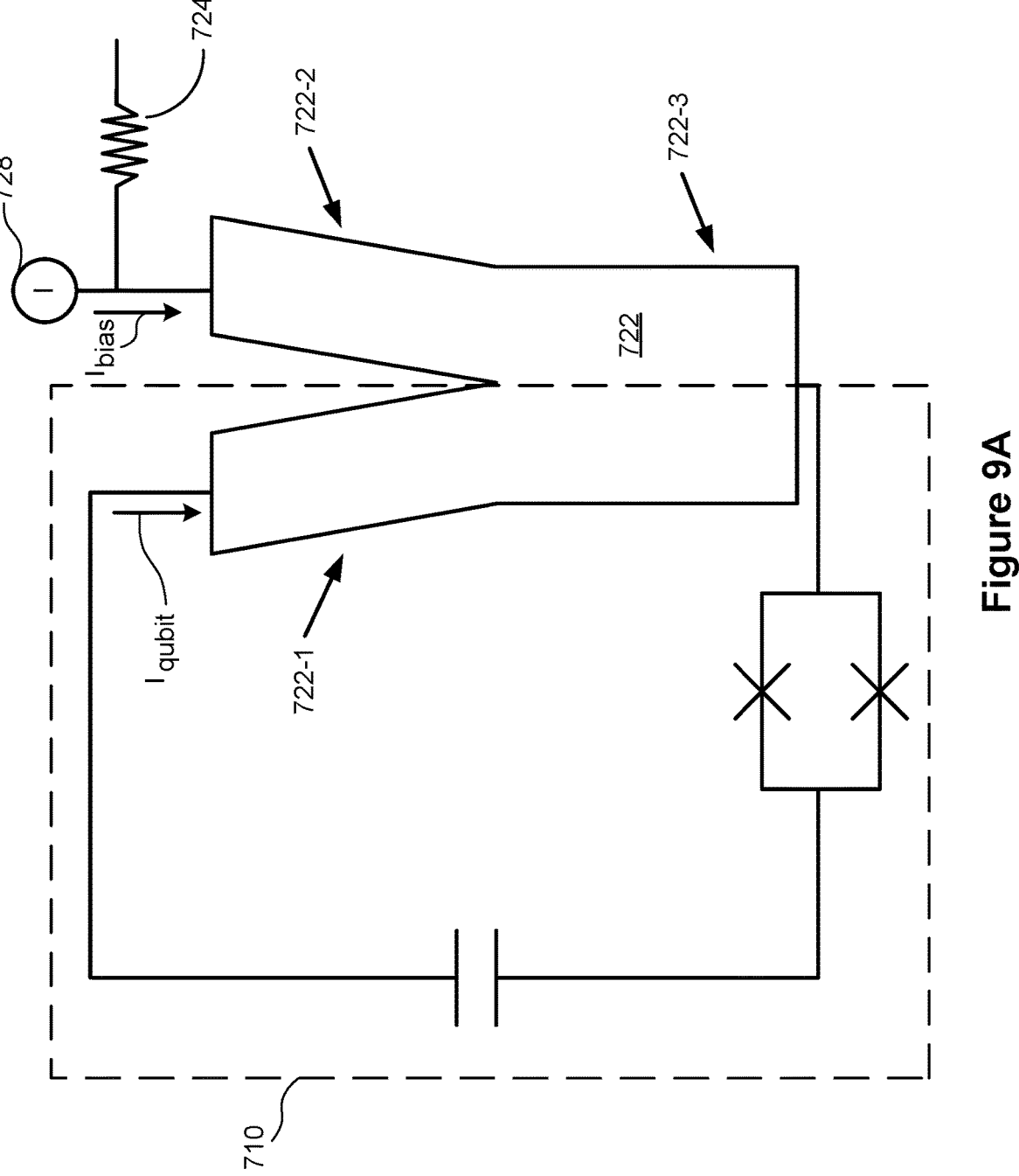
FIGS. 9A-9E are circuit diagrams illustrating operation of the detection circuit shown in FIG. 7 in accordance with some embodiments.

FIGS. 9A-9E are circuit diagrams illustrating operation of the detection circuit 720 shown in FIG. 7 in accordance with some embodiments. As shown in FIG. 9A, the resonant circuit 710 includes the first portion 722-1 and the third portion 722-3 of the superconducting component 722. The first portion 722-1 of the superconducting component 722 is configured to receive current ($I_{qubit}$) carried in the resonant circuit 710 and transmit the current ($I_{qubit}$) to the third portion 722-3 of the superconducting component 722. The current ($I_{qubit}$) is below the threshold current of the superconducting component 722 and the current density of the current ($I_{qubit}$) in the first portion 722-1 and the third portion 722-3 of the superconducting component 722 is below a threshold current density of the superconducting component 722. The second portion 722-2 of the superconducting component 722 is configured to receive a bias current ($I_{bias}$) (e.g., an input current, such as from a current source 728) and transmit the bias current ($I_{bias}$) to the third portion 722-3 of the superconducting component 722. The bias current ($I_{bias}$) is below the threshold current of the superconducting component 722 and the bias current ($I_{bias}$) in the second portion 722-2 and the third portion 722-3 of the superconducting component 722 is below a threshold current density of the superconducting component 722. When the current received at the first portion 722-1 and the second portion 722-2 of the superconducting component are equal to one another, current crowding effects, such as an accumulation or increase in current density are not observed at the junction 722-4 of the superconducting component 722 and the superconducting component 722 operates in the superconducting state (provided that the superconducting component 722 is maintained at a temperature below the threshold temperature of the superconducting component 722). In contrast, when the current received at the first portion 722-1 and the second portion 722-2 of the superconducting component differ from one another in magnitude, current crowding effects are observed at the junction 722-4 of the superconducting component 722 and the current crowding effects can lead to an accumulation or increase in current density at the junction 722-4. The superconducting component 722 is able to operate in the superconducting state as long as the temperature of the superconducting component 722 is maintained below the threshold temperature and the current transmitted through the superconducting component 722 has a current density that does not exceed the threshold current density of the superconducting component 722. In the case where the superconducting component 722 is maintained at a temperature below the threshold temperature and at least a portion of the superconducting component 722 carries a current that exceeds the threshold current density of the superconducting component 722 (e.g., via an increase in current density at the junction 722-4 due to current crowding effects), the portion (s) of the superconducting component 722 that carry a current that has a current density that exceeds the threshold current density of the superconducting component 722 transition to the non-superconducting state.

Figure 9B:
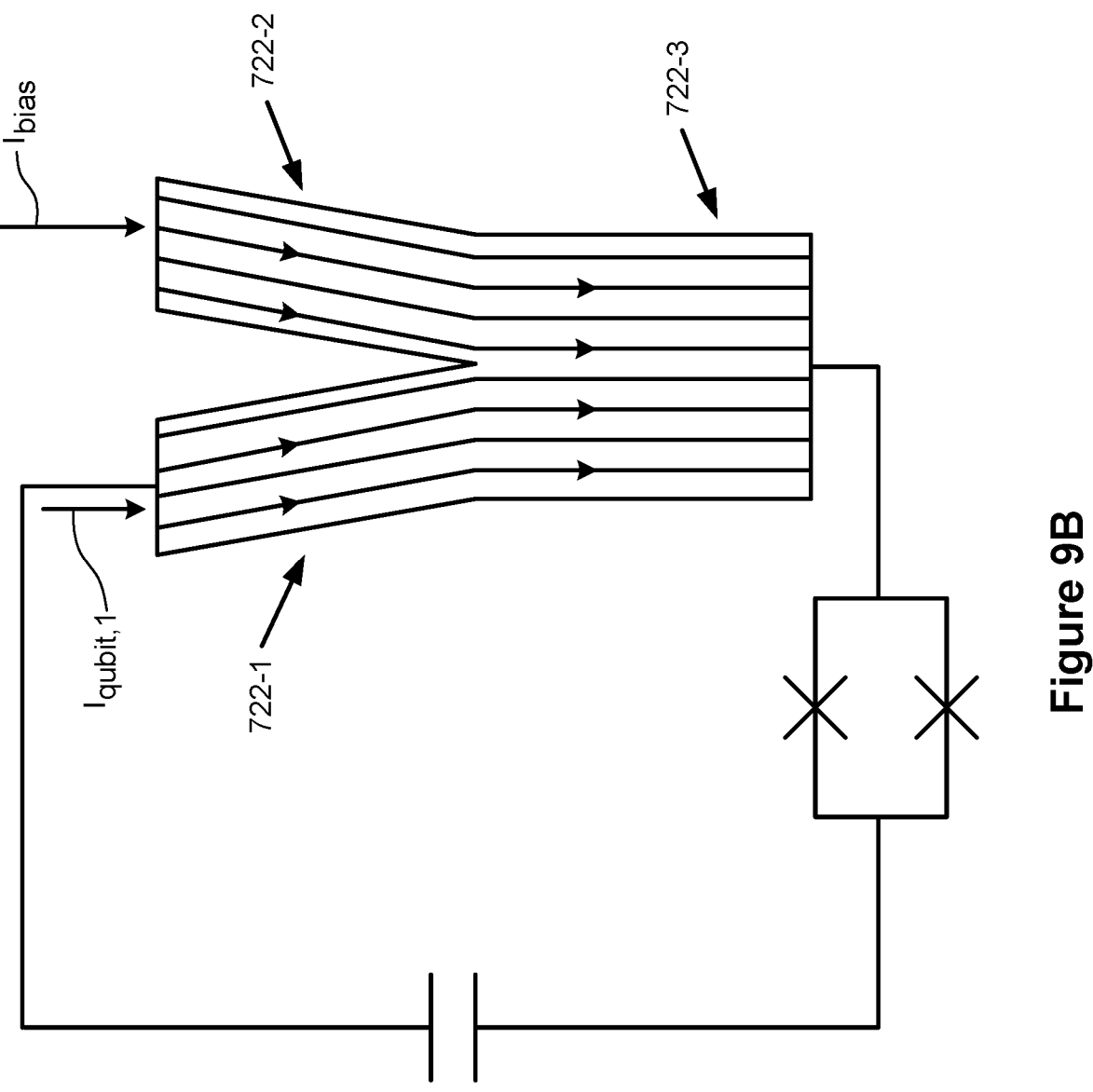
Figure 9C:
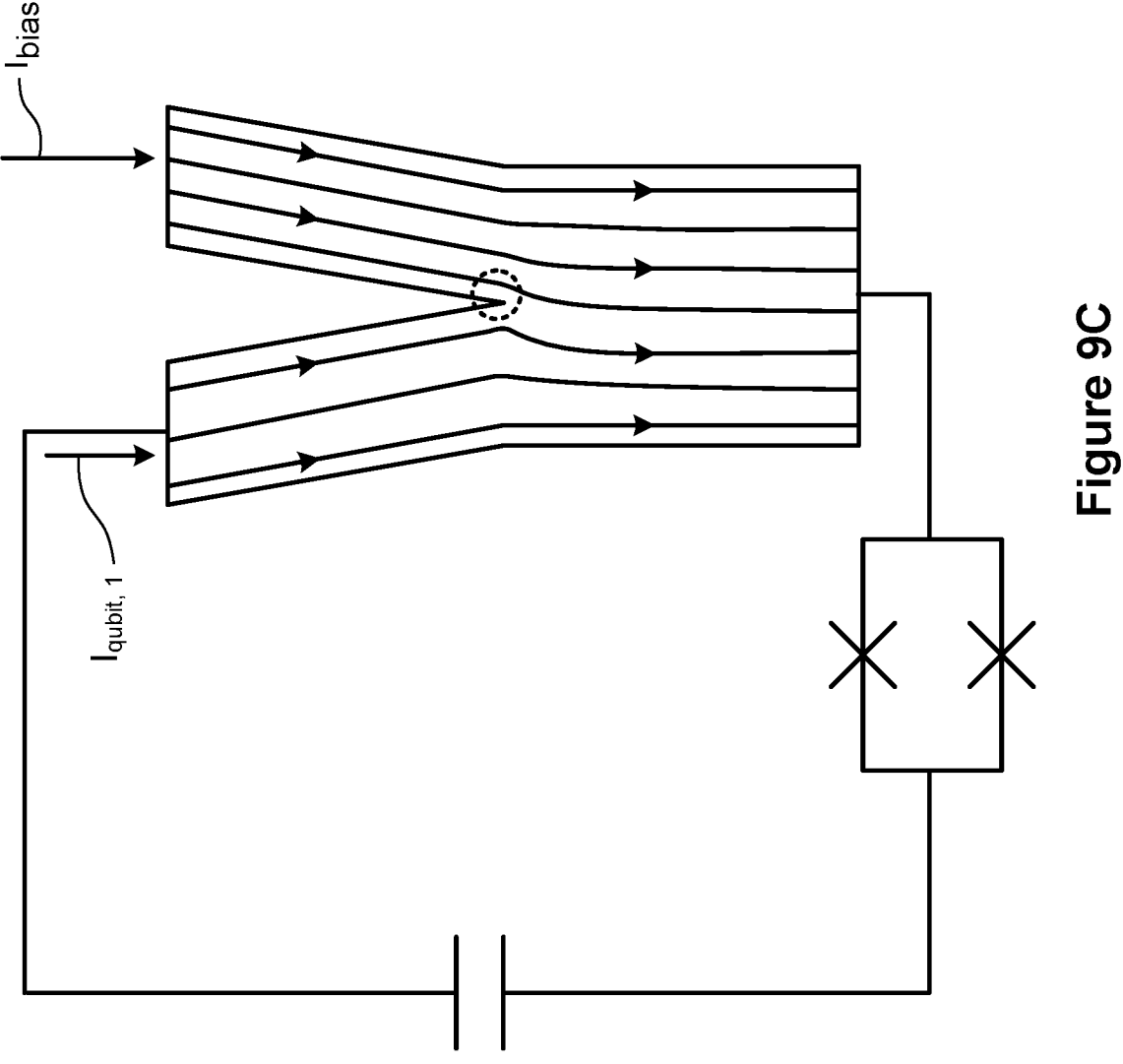

FIG. 9B illustrates operation of the detection circuit 720 while the resonant circuit 710 is in a first state (e.g., first energy state, first resonant state). The resonant circuit 710 has (e.g., generates, produces, carries, transmits) a first current ($I_{qubit,1}$) while the resonant circuit 710 is in the first state. The first portion 722-1 and third portion 722-3 of the superconducting component 722 are configured to receive and transmit the first current ($I_{qubit,1}$) while the superconducting component 722 is in the first state. The first current ($I_{qubit,1}$) and the bias current ($I_{bias}$) have a same direction and a same magnitude (or substantially same magnitude, e.g., within 10% or 20%) such that the superconducting component 722 does not experience current crowding at the junction 722-4 and the entire superconducting component 722 operates in the superconducting state. Alternatively, as shown in FIG. 9C, when the magnitude of the first current ($I_{qubit,1}$) is within a predefined margin of the magnitude of the bias current ($I_{bias}$), any current density that accumulates at the junction 722-4 of superconducting component 722 due to current crowding (represented by the dashed circle) does not exceed a threshold current density of the superconducting component 722 and the entire superconducting component 722 operates in the superconducting state.

Figure 9D:
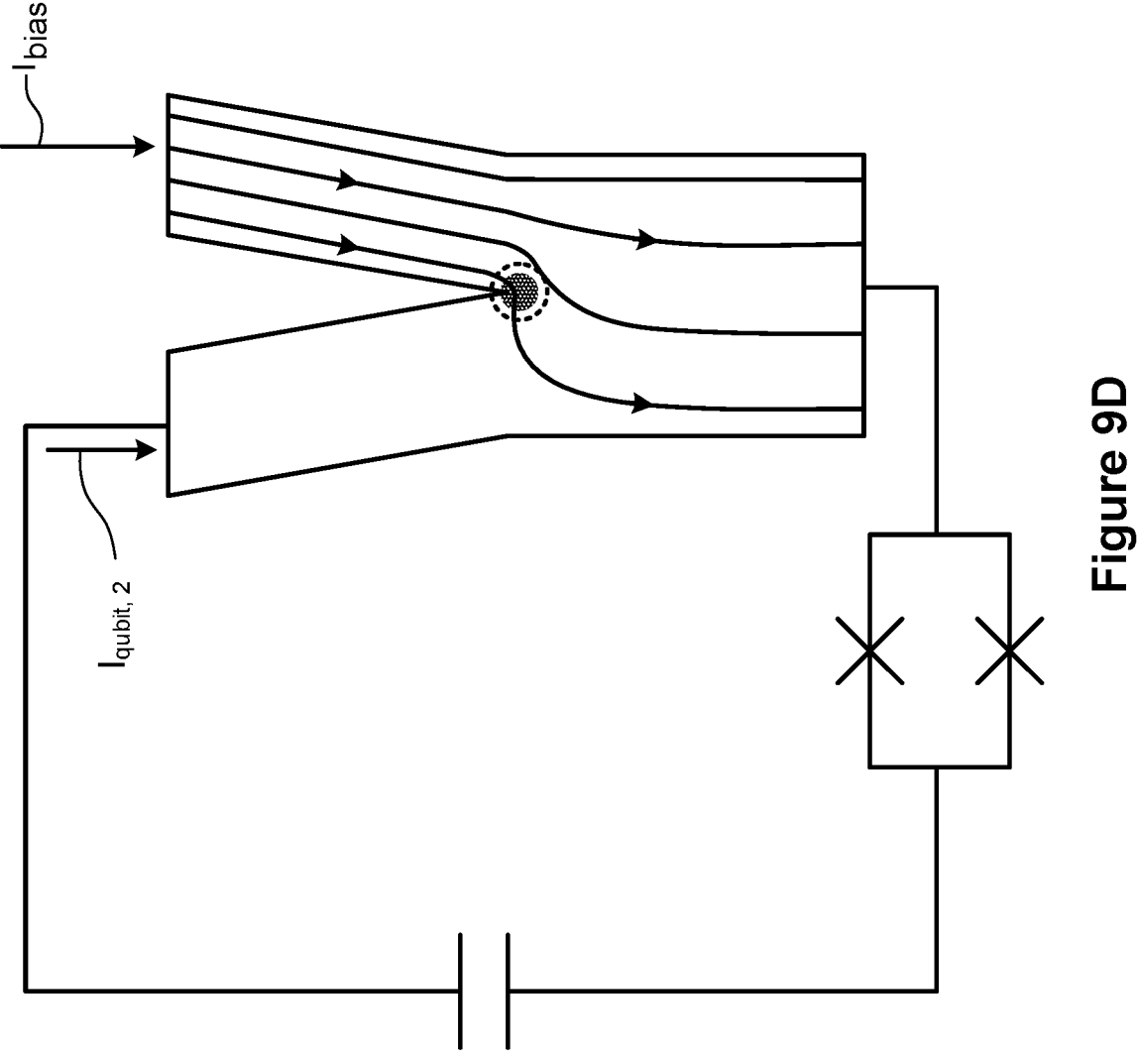
Figure 9E:
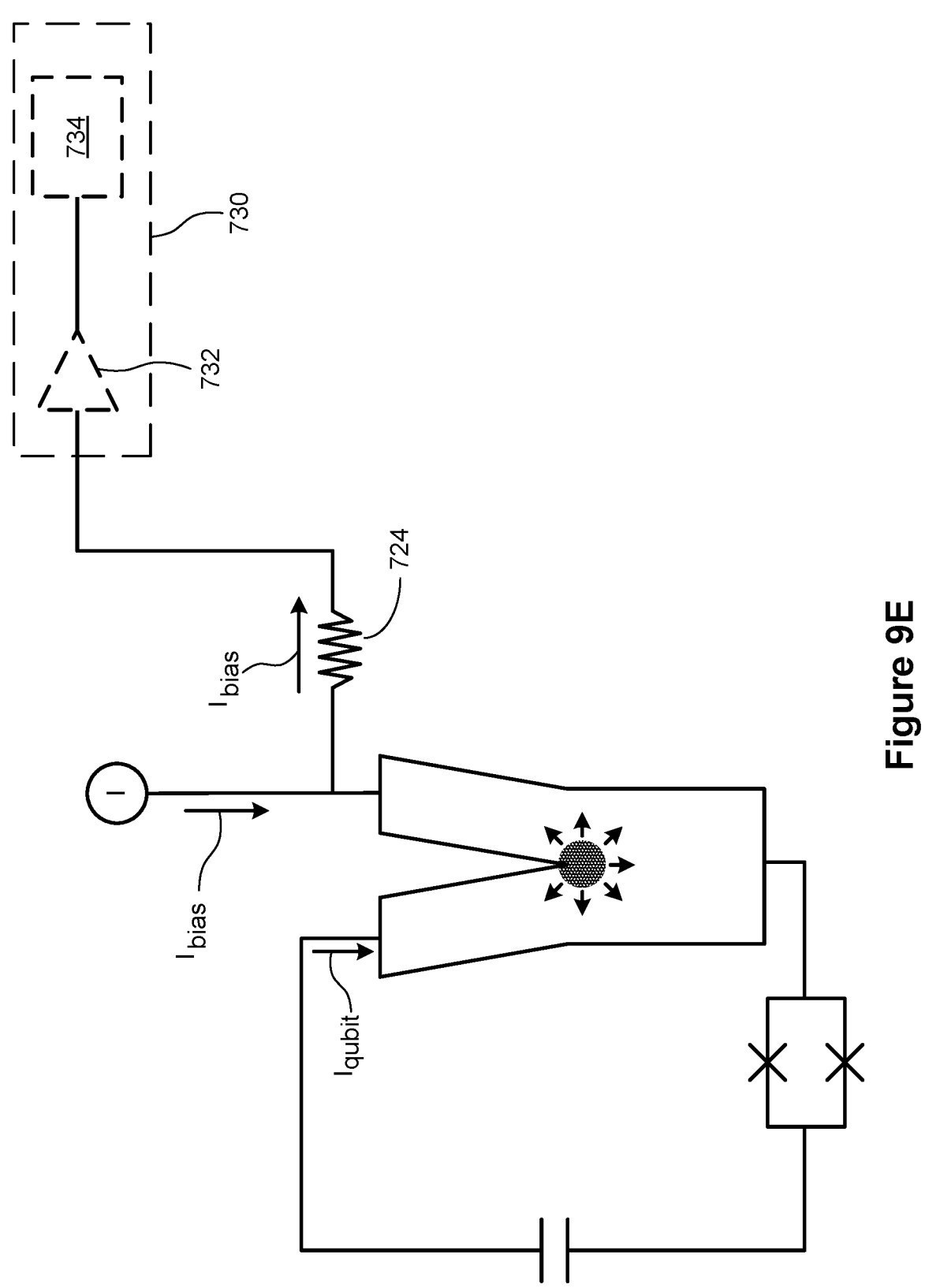

FIGS. 9D and 9E illustrate operation of the detection circuit 720 while the resonant circuit 710 is in a second state (e.g., second energy state, second resonant state) that is different from the first state. In some embodiments, such as when the resonant circuit 710 is a transmon superconducting qubit, the first state may correspond to an excited state (e.g., qubit excitation state) and the second state may correspond to a non-excited state (e.g., a ground state), or vice versa. As shown In FIG. 9D, the resonant circuit 710 has (e.g., generates, produces, carries, transmits) a second current ($I_{qubit,2}$), different (e.g., different in magnitude) from the first current ($I_{qubit,1}$), while the resonant circuit 710 is in the second state. In some embodiments, such as when the second state corresponds to an energy level that is lower than an energy level corresponding to the first state, the second current ($I_{qubit,2}$) is smaller in magnitude than the first current ($I_{qubit,1}$). The first portion 722-1 and third portion 722-3 of the superconducting component 722 are configured to receive and transmit the second current ($I_{qubit,2}$) while the superconducting component 722 is in the second state. The second current ($I_{qubit,2}$) has a same direction as the bias current ($I_{bias}$), and the magnitude of the second current ($I_{qubit,2}$) is outside of (e.g., not within) the predefined margin of the magnitude of the bias current ($I_{bias}$). Thus, current crowding effects (represented by the dashed circle) that are observed at the junction 722-4 cause an accumulation of current at the junction 722-4 such that the current density at the junction 722-4 exceeds the threshold current density of the superconducting component 722, and the junction 722-4 transitions from the superconducting state to the non-superconducting state, represented by the shaded region. In response to at least a portion (e.g., the junction 722-4) of the superconducting component 722 transitioning to the non-superconducting state, other portions of the superconducting component 722, such as portions 722-1, 722-2, and 722-3, may parasitically transition to the non-superconducting state. For example, when the junction 722-4 transitions to the non-superconducting state, its resistance increases from zero to a substantial resistance, thereby redirecting all or almost all of the current that was previously transmitted through junction 722-4 to other portions of the superconducting component 722. As a result, in this example, the current density in junction 722-4 exceeds the threshold current density of the superconducting component 722 and causes the rest of the superconducting component 722 to transition from the superconducting state to the non-superconducting state. This is sometimes called a cascading effect or cascading transition to the non-superconducting state. FIG. 9E illustrates an example where the area of the superconducting component 722 that is in the non-superconducting spreads to other portions of the superconducting component 722, represented by the shaded region. In some embodiments, the entire superconducting component 722 may transition to the non-superconducting state in response to at least a portion (e.g., the junction 722-4) of the superconducting component 722 transitioning to the non-superconducting state.

In response to at least a portion of the superconducting component 722 (e.g., junction 722-4, or the entire superconducting component 122) transitioning to the non-superconducting state, the impedance (and/or resistance) of the superconducting component 722 is greater than an impedance (and/or resistance) of the impedance component 724 and thus, at least a portion of the bias current ($I_{bias}$) is transmitted via the impedance component 724 instead of the superconducting component 722. In some embodiments, such as when the impedance component 724 is coupled to (e.g., connected to) a circuit 730 (e.g., a readout circuit), the circuit 730 receives at least a portion of the bias current ($I_{bias}$) and provides an indication (e.g., a signal) that the resonant circuit 710 is in the second state.

In response to the bias current ($I_{bias}$) being redirected (e.g., rerouted) through the impedance component 724, the superconducting component 722 receives a smaller portion of the bias current ($I_{bias}$) (and in some cases, ceases to receive any portion of the bias current ($I_{bias}$)), and the difference in the magnitude of the current carried in the first portion 722-1 of the superconducting component 722 and the magnitude of the current carried in the second portion 722-2 of the superconducting component 722 is reduced such that the current received in the first portion 722-1 of the superconducting component 722 is within the predefined margin of the current received at the second portion 722-2 of the superconducting component 722. This reduces or eliminates current crowding effects that are responsible for the increase or accumulation in the current density at the junction 722-4 of the superconducting component 722. Thus, the current density in any portion of the superconducting component 722 falls below the threshold current density and the superconducting component 722 returns (e.g., transitions) to the superconducting state provided that the superconducting component 722 is maintained at a temperature below the threshold temperature. In some implementations, the bias current is modulated to prevent the superconducting component 722 from oscillating back and forth between the superconducting and non-superconducting states. For example, the bias current may be modulated so as to oscillate at the same frequency as resonant circuit 710 (e.g., a superconducting qubit) so that the superconducting component 722 of detection circuit 720 does not switch to the normal state unless a change in the resonant circuit state (e.g., qubit state) occurs.

The predefined margin by which the magnitude of the current ($I_{qubit}$) received at the first portion 722-1 of the superconducting component 722 can differ from the magnitude of the bias current ($I_{bias}$) received at the second portion 722-2 of the superconducting component 722 without transitioning the junction 722-4 of the superconducting component 722 to the non-superconducting state depends on the geometry of the superconducting component 722. As shown above with respect to FIGS. 8B and 8C, the first portion 722-1 and the second portion 722-2 of the superconducting component 722 may a same width or may have different widths ($d_1$ and $d_2$, respectively). The predefined margin is dependent on the ratio between the width ($d_1$) of the first portion 722-1 of the superconducting component 722 and the width ($d_2$) of the second portion 722-2 of the superconducting component 722 such that a larger difference in the widths ($d_1$ and $d_2$) of the first portion 722-1 and the second portion 722-2 of the superconducting component 722 results in a smaller predefined margin (e.g., the currents ($I_{qubit}$ and $I_{bias}$) may differ by a smaller amount before the junction 722-4 of the superconducting component 722 transitions to the non-superconducting state). Thus, the superconducting component 722 shown in FIG. 8B would have a larger predefined margin compared to the superconducting component 722 shown in FIG. 8C.

Figure 10:
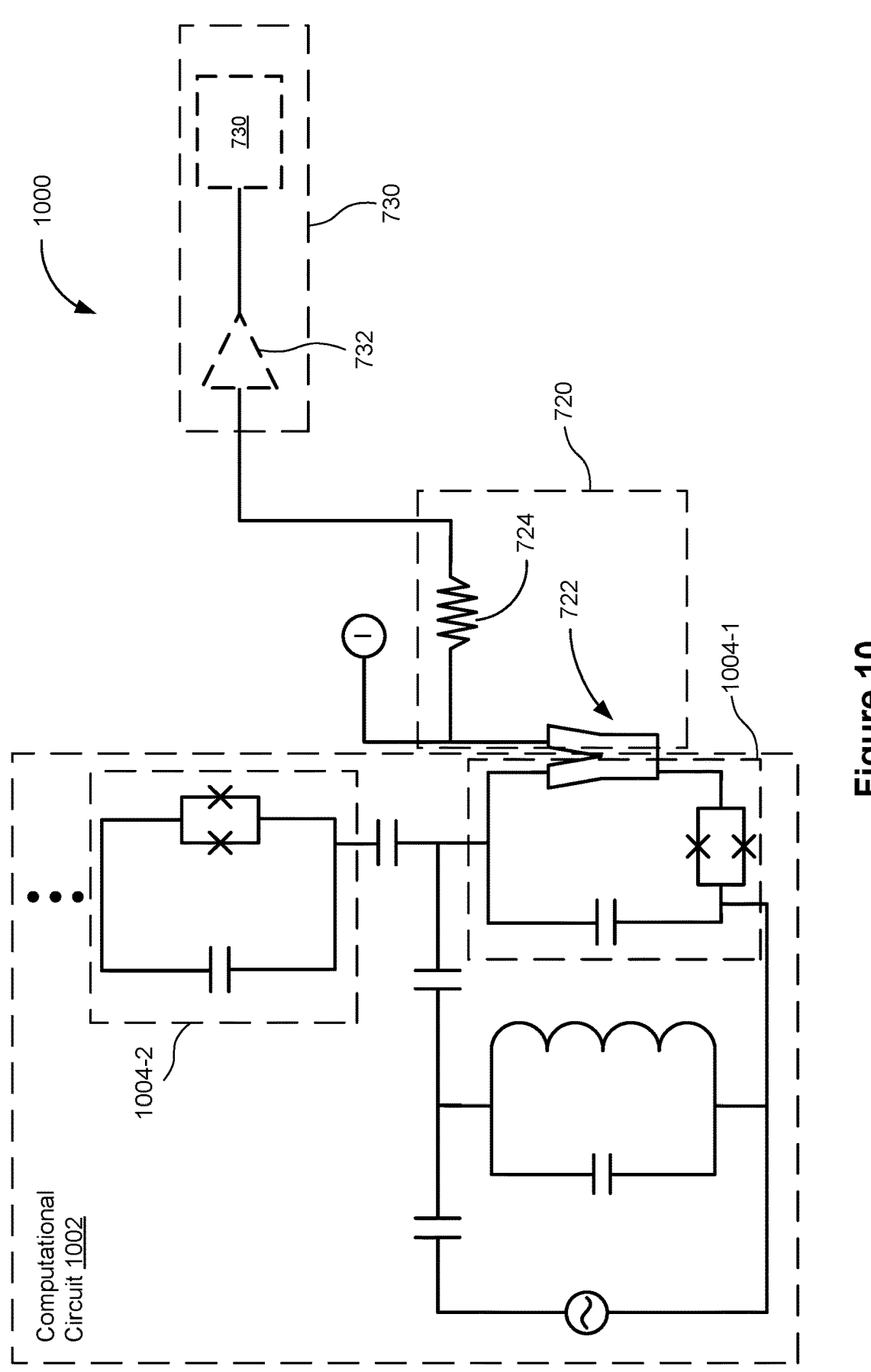
FIG. 10 is a circuit diagram illustrating a computational circuit having a plurality of resonant circuits, and a detection circuit, in accordance with some embodiments.

FIG. 10 is a circuit diagram illustrating a circuit 1000 that includes a computational circuit 1002 (e.g., a quantum computational circuit) having a plurality of resonant circuits 1004-1, 1004-2, etc. (e.g., qubit circuits), in accordance with some embodiments. In some embodiments, resonant circuit 1004-1 may correspond to resonant circuit 710 and thus, the description provided above with respect to resonant circuit 710 in FIGS. 7 and 9A-9E applies to resonant circuit 1004-1. The circuit diagram is a conceptual representation of the relationship between the different circuits and circuit components in circuit 1000, and is not necessarily a representation of physical relationships between the circuits and circuit components of circuit 1000.

In some embodiments, the computational circuit 1002 is a quantum computational circuit that produces, for a given computation, a set of output states (e.g., qubit states). In some embodiments, two or more resonant circuits 1004 are coupled to one another such that states (e.g., qubit states) of the coupled resonant circuits are coupled to one another and the coupled resonant circuits exhibit quantum entanglement (e.g., a state of the resonant circuit 1004-1 is entangled with a state of the resonant circuit 1004-2). For example, resonant circuits 1004-1 and 1004-2 may be coupled to one another such that when resonant circuit 1004-1 is in the first state, resonant circuit 1004-1 is in the second state, and vice versa. In some embodiments, the resonant circuits are coupled to one another via a cavity. Alternatively, the resonant circuits may be capacitively coupled to one another. In another example, the first resonant circuit 1004-1 and second resonant circuit 1004-2 are transmon superconducting qubits, and the transmon of the second resonant circuit 1004-2 is entangled with the transmon of the first resonant circuit 1004-; and furthermore, optionally, the transmon of the second resonant circuit 1004-2 is entangled with the transmon of the first resonant circuit 1004-1 such that the transmon of the second resonant circuit 1004-2 is in a different state from a state of the transmon generated by the first resonant circuit 1004-1.

Detection circuit 720 is electrically connected to a respective resonant circuit (e.g., resonant circuit 1004-1) in the computational circuit 1002 via superconducting component 722 and is configured to detect or facilitate detection of a state of the respective resonant circuit in the computational circuit 1002. In some embodiments, circuit 1000 includes a plurality of detector circuits 720 (e.g., detectors) that are each coupled to a corresponding resonant circuit 1004 of the computational circuit 1002, and configured to detect or facilitate detection of a state of the corresponding resonant circuit. In some embodiments, the number of detectors 720 is equal to the number of resonant circuits 1004 in the computational circuit, while in other embodiments the number of detectors 720 is less than the number of resonant circuits 1004 in the computational circuit, and thus the detectors 720 are coupled to a subset, less than all, of the resonant circuits 1004 in the computational circuit 1002.

Figure 11:
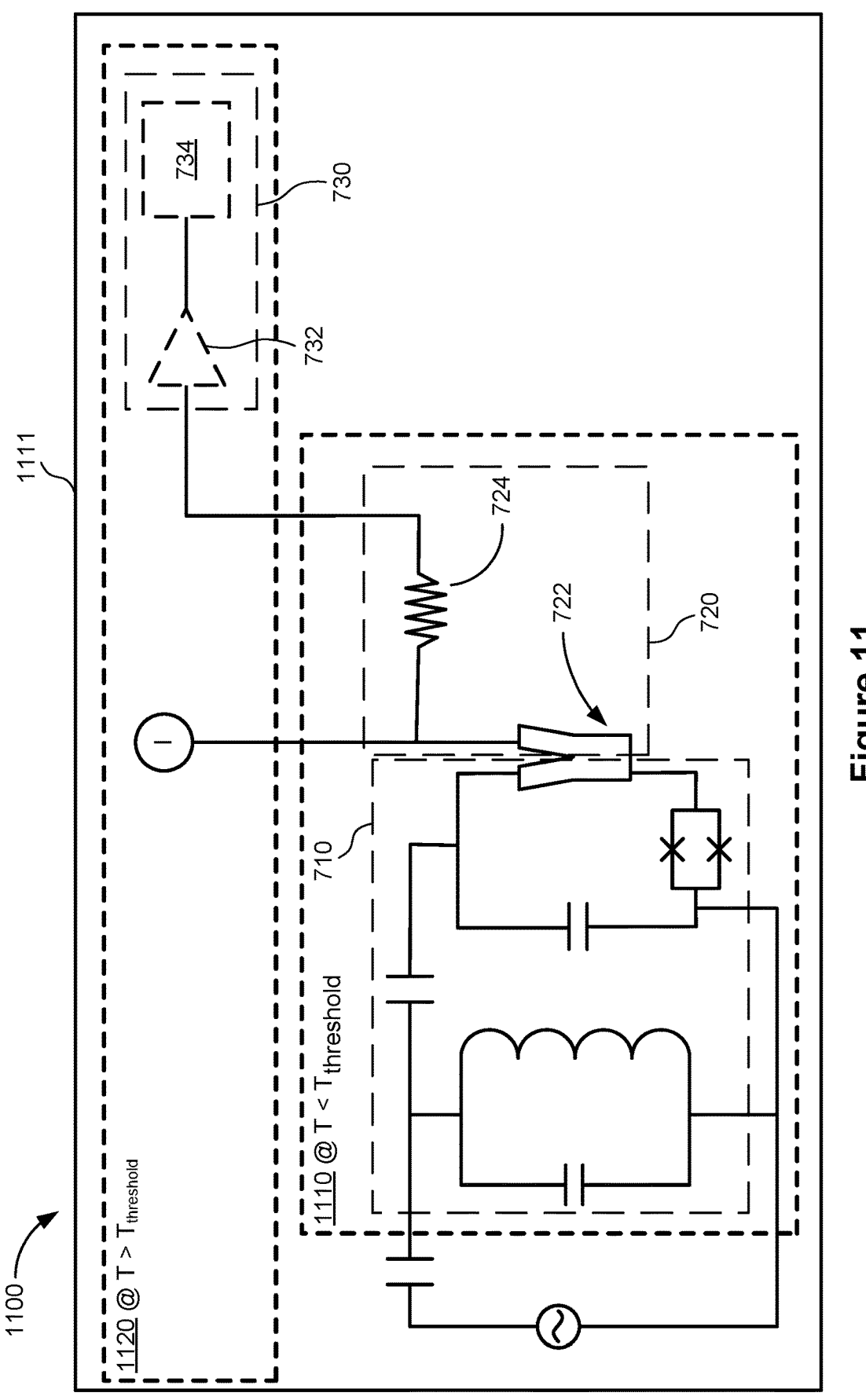
FIG. 11 is a schematic diagram representing an on-chip circuit in accordance with some embodiments.

FIG. 11 is a schematic diagram representing an on-chip circuit 1100 in accordance with some embodiments. The on-chip circuit 1100 corresponds to circuit 700 (shown in FIG. 7) and includes resonant circuit 710 and detection circuit 720. In some embodiments, as shown in FIG. 11, the resonant circuit 710 and the detection circuit 720 (including the superconducting component 722) are formed on the same chip 1111 (e.g., a same substrate). In some embodiments, the resonant circuit 710 and the detection circuit 720 (including the superconducting component 722) are located on a first portion 1110 of chip 1111 while other components of the circuit 1100 that do not include superconducting materials (e.g., voltage source, current source, ground, amplifier(s), data acquisition component) are located on a second portion 1120 of the chip 1111. By placing superconducting components of circuit 1100 on the first portion 1110 of the chip 1111, the chip 1111 only needs to maintain the first portion 1110 below a threshold temperature of the superconducting component(s) and the rest of the chip 1111 can be maintained at a higher temperature. The portion 1110 of chip 1111 is maintained at a temperature below a threshold temperature of superconducting component 722 (e.g., $T < T_{threshold}$) and the second portion 1120 of the chip 1111 can be maintained at a temperature above the threshold temperature of superconducting component 722 (e.g., $T > T_{threshold}$).

FIGS. 12A-12D are flow diagrams illustrating a method 1200 of operating a detection circuit that includes a superconducting component, for example, the detection circuit 120 shown in FIGS. 1A-1F, 2-5 and 6A-6B, in accordance with some embodiments. In some embodiments, the method 1200 is performed while the detection circuit, or at least portions of the detection circuit, are maintained at a temperature that is below a threshold temperature of a superconducting component 122 of the detection circuit 120.

The method 1200 includes maintaining (1210) a temperature of a superconducting component (e.g., superconducting component 122) in the detection circuit (e.g., detection circuit 120) below a threshold temperature (e.g., a critical temperature of the superconducting component). At least a portion of the superconducting component 122 is coupled to a first resonant circuit (e.g., first resonant circuit 110) such that the superconducting component generates a flux-induced current ($I_{induced}$) based on a state of the first resonant circuit (e.g., a state corresponding to the level of flux of the first resonant circuit 110) (e.g., the magnitude of the flux-induced current is based on a state of the first resonant circuit). An input current (e.g., bias current ($I_{bias}$)) is applied (1220) to the detection circuit.

In response to the first resonant circuit being in a first state (e.g., a non-excited state, a first energy state, a ground state), a first flux-induced current ($I_{induced,1}$) is generated (1230) in the superconducting component such that a sum of the input current and the first flux-induced current ($I_{bias}+I_{induced,1}$) does not exceed a threshold current (e.g., critical current) of the superconducting component, and the superconducting component is in a superconducting state.

In response to the first resonant circuit being in a second state (e.g., an excited state, a second energy state, a second excited state), a second flux-induced current ($I_{induced,2}$) is generated (1240) in the superconducting component such that a sum of the input current and the second flux-induced current ($I_{bias}+I_{induced,2}$) exceeds the threshold current of the superconducting component. As a result, the superconducting component transitions (1240) from the superconducting state to a non-superconducting state, and in response to the superconducting component transitioning from the superconducting state to the non-superconducting state, at least a portion of the input current ($I_{bias}$) is redirected (1240) to an impedance component of the detection circuit (e.g., impedance component 124 of the detection circuit 120). In some embodiments, a portion, less than all, of the superconducting component (e.g., the first portion 122-1 of superconducting component 122) transitions from the superconducting state to the non-superconducting state. In some embodiments, the entire superconducting component transitions from the superconducting state to the non-superconducting state.

In some embodiments, the first resonant circuit (e.g., first resonant circuit 304-1) is coupled (1212) to a second resonant circuit (e.g., second resonant circuit 304-2) such that a state of the second resonant circuit is entangled with a state of the first resonant circuit. For example, when the first resonant circuit is in the first state, the second resonant circuit is in the second state, and vice versa.

In some embodiments, a first input signal is provided (1222) (e.g., via a signal generator or microwave generator) to a computational circuit (e.g., computational circuit 302; a quantum computational circuit) that includes the first resonant circuit (e.g., first resonant circuit 110 and/or 304-1) such that the first resonant circuit is in the first state and has a first magnetic flux ($B_{induced,1}$).

In response to the first magnetic flux ($B_{induced,1}$) being coupled (e.g., inductively coupled) to the superconducting component of the detection circuit, a first flux-induced current ($I_{induced,1}$) is generated (1224) in the superconducting component. Operations 1222, 1224 and 1230, described above, correspond to a first computation by the computational circuit, and readout of a first computed result, during a first period of time. Operations 1232 and 1234, described below, and operation 1240, described above, correspond to a second computation by the computational circuit, and readout of a second computed result, during a second period of time that occurs during a different period of time than the first period of time (e.g., before or after the first period of time).

In some embodiments, a second input signal is provided (1232) (e.g., via a signal generator or microwave generator) to the computational circuit 302 (e.g., a quantum computational circuit) such that the first resonant circuit (e.g., first resonant circuit 110 and/or 304-1) is in the second state and has a second magnetic flux ($B_{induced,2}$). The second input signal is different from (e.g., has a different frequency from, has a different amplitude from) the first input signal, and the second magnetic flux ($B_{induced,2}$) is different from (e.g., different in magnitude from) the first magnetic flux ($B_{induced,1}$). In some embodiments, the second input signal has a higher frequency and/or a larger amplitude than the first input signal. In some embodiments, such as when the second state corresponds to an excited state and the first state corresponds to a non-excited state, the second magnetic flux ($B_{induced,2}$) has a larger magnitude than the first magnetic flux ($B_{induced,1}$).

In response to the second magnetic flux ($B_{induced,2}$) being coupled to the superconducting component 122 of the detection circuit 120, a second flux-induced current ($I_{induced,2}$) is generated (1234) in the superconducting component 122.

The second flux-induced current ($I_{induced,2}$) is different from the first flux-induced current a ($I_{induced,1}$). In some embodiments, as when the second state corresponds to an excited state and the first state corresponds to a non-excited state, the second flux-induced current a ($I_{induced,2}$) has a larger magnitude than the first flux-induced current a ($I_{induced,1}$).

In some embodiments, the superconducting component 122 includes (1242) a wire (e.g., a superconducting wire 210 and/or 620) forming a loop (e.g., loop 212 and/or 624). The wire 210 includes a first portion (e.g., corresponding to portion 122-1 of the superconducting component 122) with a first width ($w_1$) and a second portion (e.g., corresponding to portion 122-2 of the superconducting component 122) with a second width ($w_2$) that is larger than the first width. In accordance with the first resonant circuit 110 being in the second state (e.g., as in operation 1240), the second flux-induced current a ($I_{induced,2}$) is generated (1242) in the superconducting component 122 such that a sum of the second flux-induced current and the input current ($I_{induced,2}+I_{bias}$) exceeds the threshold current or a threshold density current in the first portion 122-1 of the superconducting component 122, thereby transitioning (1242) the first portion 122-1 of the superconducting component 122 into the non-superconducting state. In response to the first portion 122-1 of the superconducting component 122 being in the non-superconducting state, the second portion 122-2 of the superconducting component 122 transitions (1242) into the non-superconducting state.

In some embodiments, the impedance component of the detection circuit (e.g., impedance component 124) has (1244) a lower resistance than a resistance of detection circuit's superconducting component (e.g., superconducting component 122) while the superconducting component is in the non-superconducting state.

In some embodiments, while the superconducting component of the detection circuit is in the non-superconducting state, at least a portion of the input current ($I_{bias}$) is redirected from the superconducting component, through the detection circuit's impedance component, to a data acquisition circuit (e.g., data acquisition circuit 130). The data acquisition circuit receives (1252) the redirected portion of the input current ($I_{bias}$) and provides (1254) an indication that the first resonant circuit (e.g., first resonant circuit 110) is in the second state.

FIGS. 13A-13C are flow diagrams illustrating a method 1300 of operating a detection circuit (e.g., detection circuit 720, as shown in FIGS. 7, 10 and 11) that includes a superconducting component (e.g., superconducting component 722), a portion of which is shared with or overlaps a first resonant circuit. In some embodiments, the method 1300 is performed while the detection circuit, or at least portions of the detection circuit, are maintained at a temperature that is below a threshold temperature of the superconducting component of the detection circuit (e.g., superconducting component 722 of detection circuit 720).

The method 1300 includes maintaining (1310) a temperature of the superconducting component (of the detection circuit) below the threshold temperature of the superconducting component. The superconducting component includes a first portion, a second portion, a third portion and a junction (e.g., first portion 722-1, second portion 722-2, third portion 722-3, and junction 722-4) joining the first portion, the second portion, and a third portion. The superconducting component has a superconducting threshold current density and operating the superconducting component at a temperature less than a threshold temperature and at a current density below the threshold current density is required to operate the superconducting component in a superconducting state.

An input current (e.g., bias current (e.g., $I_{bias}$)) is applied (1320) to the second portion of the superconducting component (e.g., second portion 722-2 of superconducting component 722). The first portion of the superconducting component (e.g., first portion 722-1 of superconducting component 722) receives (1330) a first current (e.g., $I_{qubit,1}$) from a first resonant circuit (e.g., first resonant circuit 710) while the first resonant circuit is in a first state, and the first portion of the superconducting component receives (1340) a second current (e.g., $I_{qubit,2}$) from the first resonant circuit while the first resonant circuit is in a second state. The second state is different from the first state and the second current (e.g., $I_{qubit,2}$) is different from the first current (e.g., $I_{qubit,1}$). In some embodiments, the first state corresponds to an excited state and the second state corresponds to a non-excited state. In some embodiments, such as when the first state corresponds to an excited state and the second state corresponds to a non-excited state, the first current (e.g., $I_{qubit,1}$) has a larger magnitude than the second current (e.g., $I_{qubit,2}$). In some embodiments, the first current, the second current, and the input current travel (e.g., flow) in a same direction.

In response to the first current (e.g., $I_{qubit,1}$) or the second current (e.g., $I_{qubit,2}$) differing from the input current (e.g., $I_{bias}$), a current density at the junction of the superconducting component is increased (1350) (e.g., compared with a current density at the junction of the superconducting component when the first portion of the superconducting component receives a current equal to the input current).

In response to the current density at the junction of the superconducting component exceeding the threshold current density, the junction of the superconducting component transitions (1360) from the superconducting state to a non-superconducting state, and at least a portion of the input current is redirected (1370) to an impedance component of the detection circuit (e.g., impedance component 724 of detection circuit 720). An example is described above with reference to FIG. 9D-9E.

In some embodiments, the first portion (e.g., first portion 722-1) of the superconducting component 722 has a first width (e.g., $d_1$) and the second portion (e.g., second portion 722-2) of the superconducting component has a second width (e.g., $d_2$) that is larger than the first width.

In some embodiments, a first input signal is sent (1322) (e.g., via a signal generator or a microwave generator) to a computational circuit (e.g., quantum computational circuit 1002) that includes the first resonant circuit (e.g., first resonant circuit 1004-1) such that the first resonant circuit is in the first state. The computational circuit 1002 also includes a second resonant circuit (e.g., second resonant circuit 1004-2) that is coupled to the first resonant circuit such that a state of the second resonant circuit is entangled with a state of the first resonant circuit. For example, resonant circuits 1004-1 and 1004-2 may be coupled to one another such that when resonant circuit 1004-1 is in the first state, resonant circuit 1004-1 is in the second state, and vice versa.

In some embodiments, a second input signal is sent (1332) (e.g., via a signal generator or a microwave generator) to the computational circuit (e.g., quantum computational circuit 1002) such that the first resonant circuit is in the second state. In response, operations 1340-1370, described above, are performed. Operations 1322-1330, described above, correspond to a first computation by the computational circuit, and readout of a first computed result, during a first period of time. Operations 1332 and 1340-1370, described above, correspond to a second computation by the computational circuit, and readout of a second computed result, during a second period of time that occurs during a different period of time than the first period of time (e.g., before or after the first period of time).

In some embodiments, the impedance component of the detection circuit (e.g., impedance component 724) has (1372) a lower resistance than a resistance of the superconducting component (e.g., superconducting component 722) while the superconducting component is in the non-superconducting state.

In some embodiments, while the superconducting component is in the non-superconducting state, at least a portion of the input current (e.g., $I_{bias}$) is redirected (1374) through the impedance component to a data acquisition circuit (e.g., data acquisition circuit 730). The data acquisition circuit receives (1376) the redirected portion of the input current (e.g. $I_{bias}$) and provides (1378) an indication that the first resonant circuit is in the second state.

In light of these principles and embodiments, we now turn to certain additional embodiments.

In accordance with some embodiments, a circuit (e.g., circuit 100) includes a first resonant circuit (e.g., resonant circuit 110, 304-1, FIGS. 1A and 3) and a detection circuit (e.g., detection circuit 120). The first resonant circuit has a first magnetic flux (e.g., first magnetic flux ($B_{induced,1}$)) while the first resonant circuit is in a first state and a second magnetic flux (e.g., second magnetic flux ($B_{induced,2}$)) while the first resonant circuit is in a second state. The detection circuit includes a superconducting component (e.g., superconducting component 122) that is located (e.g., disposed) adjacent to and coupled with the first resonant circuit, and an impedance component (e.g., impedance component 124) that is coupled to the superconducting component on one end and configured, on another end, to be coupled to a second circuit (e.g., circuit 130). The superconducting component is configured to receive an input current (e.g., bias current ($I_{bias}$)) and to operate in a superconducting state while a temperature of the superconducting component is below a superconducting threshold temperature and a current carried in the superconducting component is below a threshold current of the superconducting component. The superconducting component is also configured to generate a flux-induced current (e.g., flux-induced current ($I_{induced}$)) based on a state of the first resonant circuit (e.g., the magnitude of the flux-induced current is based on a state of the first resonant circuit). While the first resonant circuit is in the first state and has the first magnetic flux, the superconducting component carries a first current, including the first flux-induced current (e.g., first flux-induced current ($I_{induced,1}$)) and the input current (e.g., bias current ($I_{bias}$)), that is less than the threshold current. While the first resonant circuit is in the second state and has the second magnetic flux the superconducting component carries a second current, including the second flux-induced current (e.g., second flux-induced current ($I_{induced,2}$)) and the input current, that exceeds the threshold current, thereby transitioning the superconducting component to a non-superconducting state while the first resonant circuit is in the second state (e.g., the superconducting component 122 of the detection circuit 120 transitions to a non-superconducting state in response to the first resonant circuit 110 transitioning from the first state to the second state).

In some embodiments, the second current (e.g., a sum of the second flux-induced current ($I_{induced,2}$) and the input current ($I_{bias}$)) is larger than the first current (e.g., a sum of the first flux-induced current ($I_{induced,1}$) and the input current ($I_{bias}$)). In some embodiments, the first flux-induced current (e.g., first flux-induced current ($I_{induced,1}$)), the second flux-induced current (e.g., second flux-induced current ($I_{induced,2}$)), and the input current travel (e.g., flow) in a same direction in the superconducting component (e.g., superconducting component 122).

In some embodiments, the impedance component (e.g., impedance component 124) is coupled, or configured to be coupled, on its other end to a second circuit (e.g., circuit 130) for conveying information regarding the state (e.g., qubit state information) of the first resonant circuit (e.g., resonant circuit 110, 340-1) to the second circuit.

In some embodiments, the second circuit (e.g., circuit 130, as shown, for example, in FIG. 1A) includes a circuit that produces a first output (e.g., first output signal) while the superconducting component (e.g., superconducting component 122) is in a superconducting state and a second output (e.g., second output signal), different from the first output, while the superconducting component is in the non-superconducting state. Thus, the second circuit is able to provide an indication of the state of the resonant circuit (e.g., resonant circuit 110, 310-4). For example, the second circuit provides the first output in response to the resonant circuit being in the first state and provides the second output in response to the resonant circuit being in the second state.

In some embodiments, the impedance component (e.g., impedance component 124) includes a resistive component (e.g., a resistor, an electrical component that has a non-zero resistance) that is coupled in parallel to the superconducting component (e.g., superconducting component 122) of the detection circuit. The resistive component has a resistance that is smaller than a resistance of the superconducting component while the superconducting component is in a non-superconducting state such that at least a portion of the input current (e.g., bias current ($I_{bias}$)) is redirected from the superconducting component to the second circuit, via the impedance component, while the superconducting component is in the non-superconducting state.

In some embodiments, the superconducting component (e.g., superconducting component 122) includes a loop (e.g., loop 212) located adjacent to and coupled (e.g., inductively coupled) with the first resonant circuit (e.g., resonant circuit 110, 304-1).

In some embodiments, the superconducting component includes (e.g., superconducting component 122) a wire (e.g., wire 210, 620) that has an asymmetrical width such that a first portion of the wire (corresponding to the portion 122-1 of the superconducting component 122) has a first width (e.g., first width $w_1$)) and a second portion of the wire (corresponding to the portion 122-2 of the superconducting component 122) has a second width (e.g., second width ($w_2$)) that is greater than the first width (e.g., $w_2 > w_1$). In some embodiments, the first portion of the wire is referred to as a constriction region. In some embodiments, the first portion of the superconducting component (e.g., the wire of the superconducting component) is closer to the first resonant circuit (e.g., resonant circuit 110, 304-1) than the second portion of the superconducting component.

In some embodiments, the second magnetic flux (e.g., second magnetic flux ($B_{induced,2}$)) is larger than the first magnetic flux (e.g., first magnetic flux ($B_{induced,1}$)), and the second flux-induced current (e.g., second flux-induced current ($I_{induced,2}$)) in the superconducting component (e.g., superconducting component 122) while the first resonant circuit (e.g., resonant circuit 110, 310-4) is in the second state is larger than the first flux-induced current (e.g., first flux-induced current ($I_{induced,1}$)) in the superconducting component while the first resonant circuit is in the first state.

In some embodiments, the flux-induced current (e.g., flux-induced current ($I_{induced}$), including first flux-induced current ($I_{induced,1}$) and second flux-induced current ($I_{induced,2}$)), has a same direction in the superconducting component as the input current (e.g., bias current ($I_{bias}$)).

In some embodiments, the first resonant circuit (e.g., resonant circuit 110, 310-4) is a transmon superconducting qubit.

In some embodiments, the circuit (e.g., circuit 100) also includes a second resonant circuit (e.g., second resonant circuit 304-2) coupled to the first resonant circuit (e.g., first resonant circuit 304-1) such that the second resonant circuit and first resonant circuit exhibit quantum entanglement (e.g., the state of the second resonant circuit is entangled with a state of the first resonant circuit), as described above with reference to FIG. 3.

In some embodiments, the first resonant circuit (e.g., first resonant circuit 110, 304-1) and the detection circuit (e.g., detection circuit 120) are formed on a same substrate (e.g., chip 401, portion 410 of the chip 401, substrate 520).

In some embodiments, the detection circuit (e.g., detection circuit 120) is formed on a first layer (e.g., layer 510) and the first resonant circuit (e.g., first resonant circuit 110, 304-1) is formed on a second layer e.g., layer 514) distinct from the first layer of a multilayer circuit structure. In some embodiments, a third layer (e.g. layer 512) is disposed between the first layer and the third layer. In some embodiments, the third layer includes (e.g., is composed of) a dielectric material.

In accordance with some embodiments, a circuit (e.g., circuit 700) includes a first resonant circuit (e.g., resonant circuit 710, 1004-1) and a detection circuit (e.g., detection circuit 720). The first resonant circuit is configured to generate a first current (e.g., first current ($I_{quibit,1}$)) in a first state and a second current (e.g., second current ($I_{quibit,2}$)) in a second state. The second current is different from the first current and the second state is different from the first state. The detection circuit includes a superconducting component (e.g., superconducting component 722) and an impedance component (e.g., impedance component 724) that is coupled to the superconducting component on one end and configured, on another end, to be coupled to a second circuit (e.g., circuit 730). The superconducting component has a first portion (e.g., first portion 722-1), a second portion (e.g., second portion 722-2) that is distinct from the first portion, a third portion (e.g., third portion 722-3) that is distinct from each of the first and second portions, and a junction (e.g., junction 722-4) that joins the first, second, and third portions.

The superconducting component has superconducting threshold temperature and a threshold current density, and operating the superconducting component at a temperature less than threshold temperature and at a current density below the threshold current density is required to operate the superconducting component in a superconducting state. The first resonant circuit includes the first portion and third portion of the superconducting component, and the first portion of the superconducting component is coupled to receive at least a portion of the first current while the first resonant circuit is in the first state and at least a portion of the second current while the first resonant circuit is in the second state. The second portion of the superconducting component is configured to receive an input current (e.g., bias current ($I_{bias}$)). In response to a difference between the input current in the second portion and a current in the first portion of the superconducting component, the junction is configured to experience current crowding, including a current density that is greater than the threshold current density, and transition to a non-superconducting state.

In some embodiments, the superconducting component (e.g., superconducting component 722) of the detection circuit (e.g., detection circuit 720) is configured to transition to a non-superconducting state in response to the junction (e.g., junction 722-4) of the superconducting component transitioning to the non-superconducting state.

In some embodiments, the second circuit (e.g., circuit 730) includes a circuit that produces a first output while the superconducting component (e.g., superconducting component 722) is in a superconducting state and a second output, different from the first output, while the superconducting component is in the non-superconducting state. Thus, the second circuit is able to provide an indication of the state of the resonant circuit (e.g., resonant circuit 710, 1000-4). For example, the second circuit provides the first output in response to the resonant circuit being in the first state and provides the second output in response to the resonant circuit being in the second state.

In some embodiments, the impedance component (e.g., impedance component 724) includes a resistive component (e.g., a resistor, an electrical component that has a non-zero resistance) that has a resistance that is smaller than a resistance of the superconducting component (e.g., superconducting component 722) while the superconducting component is in a non-superconducting state such that the second circuit (e.g., circuit 730) receives at least a portion of the input current (e.g., bias current ($I_{bias}$)), via the impedance component, while the superconducting component is in the non-superconducting state.

In some embodiments, the superconducting component (e.g., superconducting component 722) includes a Y-shaped component (shown in FIGS. 8A-8C).

In some embodiments, the first portion (e.g., first portion 722-1) of the superconducting component (e.g., superconducting component 722) has a first width (e.g., width ($d_1$)) and the second portion (e.g., second portion 722-2) of the superconducting component has a second width (e.g., width ($d_2$)) that is larger than the first width (e.g., $d_2 >$ In some embodiments, the first current (e.g., first current ($I_{quibit,1}$)) or the second current (e.g., second current ($I_{quibit,2}$) has a same direction as the input current (e.g., bias current ($I_{bias}$)) and a magnitude that is within a predefined margin of a magnitude of the input current.

In some embodiments, the first resonant circuit (e.g., resonant circuit 710, 1004-1) is a transmon superconducting qubit.

In some embodiments, the circuit (e.g., circuit 700) includes a second resonant circuit (e.g., resonant circuit 1004-2) that is coupled to the first resonant circuit (e.g., resonant circuit 1004-1) such that the second resonant circuit and first resonant circuit exhibit quantum entanglement. For example, the first and second resonant circuits may be coupled to one another such that the first and second resonant circuits are in different states at the conclusion of a computation; e.g., at the conclusion of the computation, if first resonant circuit is in a first state, the second resonant circuit is in a second state, different from the first state, and vice versa.

In some embodiments, the first resonant circuit (e.g., resonant circuit 710, 1004-1) and the detection circuit (e.g., detection circuit 720) are formed on a same substrate (e.g., chip 1111, or portion 1110 of chip 1111).

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives.

As used herein, a "superconducting circuit" or "superconductor circuit" is a circuit having one or more superconducting materials. For example, a superconducting photodetector circuit is a photodetector circuit that includes one or more superconducting materials. As used herein, a "superconducting" material is a material that is capable of operating in a superconducting state (under particular conditions). For example, a material that operates as a superconductor (e.g., operates with zero electrical resistance) when cooled below a particular temperature (e.g., a critical temperature) and having less than a threshold current flowing through it. A superconducting material is also called a superconduction-capable material. In some embodiments, the superconducting materials operate in a non-superconducting state during which the materials have a non-zero electrical resistance (e.g., a resistance in the range of one thousand to ten thousand ohms). For example, a superconducting material supplied with a current greater than a threshold superconducting current for the superconducting material may transition from a superconducting state with zero electrical resistance to a non-superconducting state with non-zero electrical resistance. As an example, superconducting wire 210 is a superconducting material that is capable of operating in a superconducting state (e.g., under particular operating conditions).

As used herein, a "wire" is a section of material configured for transferring electrical current. In some embodiments, a wire includes a section of material conditionally capable of transferring electrical current (e.g., a wire made of a superconducting material that is capable of transferring electrical current while the wire is maintained at a temperature below a critical temperature). A cross-section of a wire (e.g., a cross-section that is perpendicular to a length of the wire) optionally has a geometric (e.g., flat or round) shape or an irregular (also sometimes called a non-geometric) shape. In some embodiments, a length of a wire is greater than a width or a thickness of the wire (e.g., the length of a wire is at least 5, 6, 7, 8, 9, or 10 times greater than the width and the thickness of the wire).

It will also be understood that, although the terms first, second, etc. are, in some instances, used herein to describe various elements, these elements should not be limited by these terms. These terms are only used to distinguish one element from another. For example, a first layer could be termed a second layer, and, similarly, a second layer could be termed a first layer, without departing from the scope of the various described embodiments. The first layer and the second layer are both layers, but they are not the same layer unless explicitly stated as such.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A circuit, comprising:
a first resonant circuit having a first magnetic flux while the first resonant circuit is in a first state and a second magnetic flux while the first resonant circuit is in a second state;
a detection circuit distinct from the first resonant circuit, the detection circuit comprising:
a superconducting loop located adjacent to and inductively coupled with the first resonant circuit, wherein the superconducting loop is configured to:
receive an input current;
operate in a superconducting state while a temperature of the superconducting loop is below a superconducting threshold temperature and a current carried in the superconducting loop is below a threshold current of the superconducting loop; and
generate a flux-induced current based on a state of the first resonant circuit such that:
the superconducting loop carries a first current, less than the threshold current, while the first resonant circuit is in the first state and has the first magnetic flux; and
the superconducting loop carries a second current that exceeds the threshold current while the first resonant circuit is in the second state and has the second magnetic flux, thereby transitioning the superconducting loop to a non-superconducting state while the first resonant circuit is in the second state; and
an impedance component coupled to the superconducting loop on one end and configured, on another end, to be coupled to a second circuit.

2. The circuit of claim 1, wherein the second circuit comprises a circuit that produces a first output while the superconducting loop is in the superconducting state and a second output, different from the first output, while the superconducting loop is in the non-superconducting state.

3. The circuit of claim 1, wherein the impedance component comprises a resistive component coupled in parallel to the superconducting loop, the resistive component having a resistance that is smaller than a resistance of the superconducting loop while the superconducting loop is in the non-superconducting state such that at least a portion of the input current is redirected from the superconducting loop to the second circuit while the superconducting loop is in the non-superconducting state.

4. The circuit of claim 1, wherein the superconducting loop includes a wire that has an asymmetrical width such that a first portion of the wire has a first width and a second portion of the wire has a second width that is greater than the first width.

5. The circuit of claim 1, wherein:

the second magnetic flux is larger than the first magnetic flux; and the flux-induced current in the superconducting loop while the first resonant circuit is in the second state is larger than the flux-induced current in the superconducting loop while the first resonant circuit is in the first state.

6. The circuit of claim 1, wherein the flux-induced current has a same direction as the input current.

7. The circuit of claim 1, wherein the first resonant circuit is a transmon superconducting qubit.

8. The circuit of claim 1, further comprising a second resonant circuit coupled to the first resonant circuit such that the second resonant circuit and first resonant circuit exhibit quantum entanglement.

9. The circuit of claim 1, wherein the first resonant circuit and the detection circuit are formed on a same substrate.

10. The circuit of claim 9, wherein:

the detection circuit is formed on a first layer; and the first resonant circuit is formed on a second layer distinct from the first layer.

11. The circuit of claim 1, further comprising a material arranged to separate the superconducting loop from the first resonant circuit.

12. The circuit of claim 11, wherein the material is a dielectric material.

13. The circuit of claim 1, wherein the superconducting loop comprises a constriction region adjacent to the first resonant circuit.

14. A method of operating a detection circuit, comprising:

maintaining a temperature of a superconducting loop in a detection circuit below a threshold temperature, wherein the superconducting loop is positioned adjacent to and inductively coupled with a resonant circuit; and applying an input current to the superconducting loop, wherein the input current is below a threshold current of the superconducting loop, and wherein the superconducting loop operates in a superconducting state with the input current while the temperature is maintained;

generating a flux-induced current based on a magnetic flux received from the resonant circuit, wherein:

the superconducting loop carries a first current, less than the threshold current, while the resonant circuit is in the first state and has a first magnetic flux; and the superconducting loop carries a second current that exceeds the threshold current while the resonant circuit is in the second state and has a second magnetic flux, thereby transitioning the superconducting loop to a non-superconducting state while the resonant circuit is in the second state; and in conjunction with transitioning the superconducting loop to the non-superconducting state, redirecting at least a portion of the input current from the superconducting loop to an impedance component of the detection circuit.

15. The method of claim 14, wherein the flux-induced current flows in a same direction through the superconducting loop as the input current.

16. The method of claim 14, wherein the resonant circuit is a transmon superconducting qubit.

17. The method of claim 14, wherein the superconducting loop comprises a constriction region adjacent to the resonant circuit.

* * * * *